(12) United States Patent
Toma

(10) Patent No.: US 6,778,214 B1
(45) Date of Patent: Aug. 17, 2004

(54) CHARGE GENERATION OF SOLID STATE IMAGE PICKUP DEVICE

(75) Inventor: Tetsuo Toma, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/261,217

(22) Filed: Mar. 3, 1999

(30) Foreign Application Priority Data

Mar. 4, 1998 (JP) .......................................... 10-069454
May 14, 1998 (JP) .......................................... 10-150730

(51) Int. Cl.⁷ ............................ H04N 3/14; H04N 5/355
(52) U.S. Cl. ................................................... 348/314
(58) Field of Search ................................. 348/311, 314, 348/317; 257/435, 445, 258

(56) References Cited

U.S. PATENT DOCUMENTS 4,696,021 A * 9/1987 Kawahara et al. ............. 377/58
4,748,486 A * 5/1988 Miyatake ..................... 257/223
4,763,204 A * 8/1988 Kinoshita et al. ........... 386/120
5,426,317 A * 6/1995 Hirota ......................... 257/230
5,828,407 A * 10/1998 Suzuki ........................ 348/312

* cited by examiner

Primary Examiner—Andrew Christensen
Assistant Examiner—Tia M. Harris
(74) Attorney, Agent, or Firm—Sughrue Mion, PLLC

(57) ABSTRACT

Signal charges photo-excited and stored in photodiodes are read by two field read operations of interlace drive. At least during a period of reading a first field, a predetermined voltage is applied to the semiconductor substrate to set the potential barrier of a region between each photodiode and a corresponding overflow drain region higher than the channel potential barrier between the photodiode and a corresponding vertical transfer path. It is therefore possible to prevent signal charges to be read during the next field read operation from leaking to the overflow drain during the first field read operation.

35 Claims, 26 Drawing Sheets

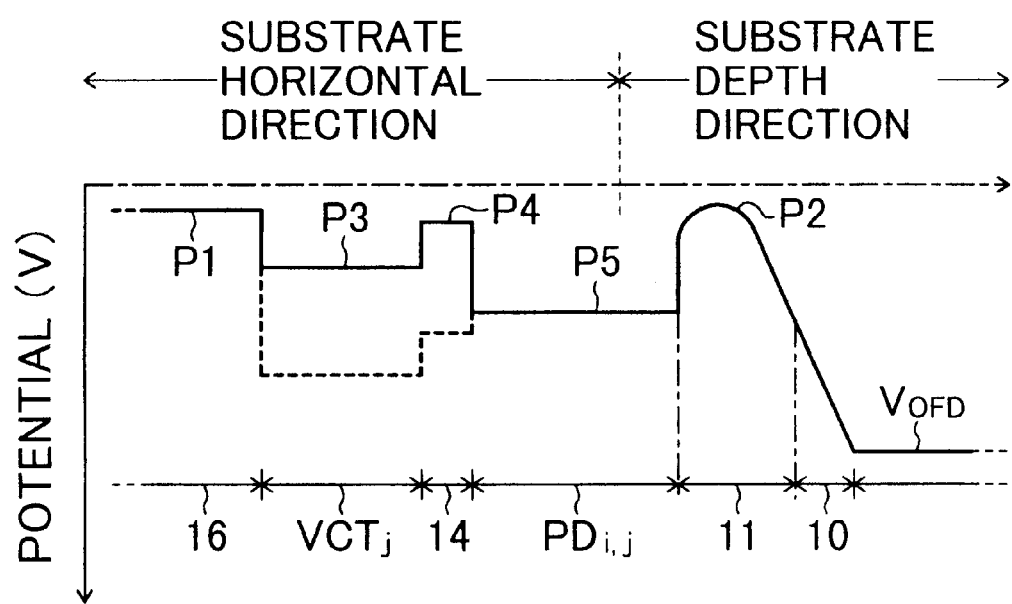

CHARGE GENERATION OF SOLID STATE IMAGE PICKUP DEVICE

This application is based on Japanese patent applications No. 10-69454 filed on Mar. 4, 1998, and No. 10-150730 filed on May 14, 1998, the entire contents of which are incorporated herein by reference.

BACKGROUND OF THE INVENTION a) Field of the Invention

The present invention relates to a solid state image pickup device capable of storing an increased amount of signal charges in each light reception element, the solid state image pickup device being of the type that signal charges stored in light reception elements are read to form a frame image through interlace drive.

b) Description of the Related Art

A charge coupled solid state image pickup device (hereinafter called a CCD image pickup device) of an interline transfer type is known. As shown in FIG. 7A, this CCD image pickup device is constituted of: a number of photodiodes (light reception elements) $PD_{1,1}$, to $PD_{I,J}$ disposed in a matrix (rows and columns) layout; vertical transfer paths $VCT_1$ to $VCT_J$ juxtaposed with the photodiodes $PD_{1,1}$ to $PD_{I,J}$ via transfer gates $TG_{1,1}$ to $TG_{I,j}$; a horizontal transfer path HCT connected at one ends of the vertical transfer paths $VCT_1$ to $VCT_J$; and an output circuit OUT connected to at one end of the horizontal transfer path HCT.

The vertical transfer paths $VCT_1$ to $VCT_J$ vertically transfer signal charges photo-excited and stored in the photodiodes $PD_{1,1}$ to $PD_{I,J}$ in response to four-phase drive signals V1 to V4 synchronizing with a signal representative of one horizontal scan period. The horizontal transfer path HCT horizontally transfers the signal charges transferred from the vertical transfer paths $VCT_1$ to $VCT_J$ in response to two-phase drive signals H1 and H2 synchronizing with a signal representative of one horizontal blanking period. By repeating such vertical and horizontal transfer operations, the output circuit OUT outputs a pixel signal Vout of one frame.

Of the photodiodes $PD_{1,1}$ to $PD_{I,J}$, those on odd rows are assigned an odd field, and those on even rows are assigned an even field. With an interlace drive using a vertical transfer by the four-phase drive signals V1 to V4 and a horizontal transfer by the two-phase drive signals H1 and H2, two fields of an odd field and an even field are read to output the pixel signal Vout of one frame.

The interlace drive is executed synchronously with four-phase drive signals V1 to V4 such as shown in FIG. 7B. Potential profiles of the transfer gates $TG_{1,1}$ to $TG_{I,J}$ and vertical transfer paths $VCT_1$ to $VCT_J$ change synchronously with the four-phase drive signals V1 to V4, as shown in FIGS. 8AA to 8EB, in order to read odd and even fields.

In reading signal charges $Q_O$ of the odd field shown hatched, the potential profiles change as shown in FIGS. 8AA, 8BA, 8CA, 8DA, and 8EA. In reading signal charges $Q_E$ of the even field shown hatched, the potential profiles change as shown in FIGS. 8AB, 8BB, 8CB, 8DB, and 8EB. In FIGS. 8AA to 8EB, the abscissa represents a horizontal direction in FIG. 7A and the ordinate represents a potential. The photodiodes and transfer gates of the odd field are represented by $PD_O$ and $TG_O$, respectively. The photodiodes and transfer gates of the even field are represented by $PD_E$ and $TG_E$, respectively. Each or all of the vertical transfer paths $VCT_1$ to $VCT_J$ are represented by VCT where applicable.

During an exposure period $\tau_{ON}$ shown in FIG. 7B, all channel potentials (hereinafter called channel barriers) under the transfer gates $TG_O$ and $TG_E$ are made high as shown in FIGS. 8AA and 8AB so that photo-excited signal charges $Q_O$ and $Q_E$ corresponding in amount to an object illuminance hv are stored in all photodiodes $PD_O$ and $PD_E$.

At a timing t1 after the exposure period $\tau_{ON}$, the drive signal V1 which is a pulse PL1 having a level higher than a predetermined threshold voltage Vth is applied to the transfer gates $TG_O$ of the odd field. Therefore, as shown in FIG. 8BA, only the channel barriers under the transfer gates $TG_O$ are made low so that only the signal charges $Q_O$ of the photodiodes $PD_O$ are transferred to the vertical transfer paths VCT. As shown in FIG. 8BB, the signal charges $Q_E$ in the photodiodes $PD_E$ are not transferred to the vertical transfer paths VCT but are stored in the photodiodes $PD_E$.

During an odd field read period $\tau_1$ (FIG. 7B), the vertical transfer paths $VCT_1$ to $VCT_J$ vertically transfer the transferred signal charges $Q_O$ in synchronization with the four-phase drive signals V1 to V4, and the horizontal transfer path HCT horizontally transfers the vertically transferred signal charges $Q_O$ and outputs the pixel signal Vout corresponding to the odd field. The potential profiles during the odd field read period $\tau_1$ are as shown in FIGS. 8CA and 8CB. The potential profile shown in FIG. 8CB will be later detailed.

At a timing t2 after the odd field read period $\tau_1$, the drive signal V3 which is a pulse PL3 having a level higher than the predetermined threshold voltage Vth is applied to the transfer gates $TG_E$ of the even field. Therefore, as shown in FIGS. 8DA and 8DB, only the channel barriers under the transfer gates $TG_E$ are made low so that only the signal charges $Q_E$ of the photodiodes $PD_E$ are transferred to the vertical transfer paths VCT.

During an even field read period $\tau_2$, the vertical transfer paths $VCT_1$ to $VCT_J$ vertically transfer the transferred signal charges $Q_E$ in synchronization with the four-phase drive signals V1 to V4, and the horizontal transfer path HCT horizontally transfers the vertically transferred signal charges $Q_E$ and outputs the pixel signal Vout corresponding to the even field. The potential profiles during the even field read period $\tau_2$, are as shown in FIGS. 8EA and 8EB.

As above, the pixel signals of one frame can be read by reading two fields during the odd field read period $\tau_1$ and even field read periods $\tau_2$.

The conventional CCD image pickup device is, however, associated with some problem which is caused by reading the pixel signals of one frame from two fields, at different timings.

With th conventional CCD image pickup device, the signal charges in the photodiodes $PD_E$ of the even field are read during the even field read period $\tau_2$ after the odd field read period $\tau_1$. However, as shown in FIG. 8CB, during the odd field read period $\tau_1$, the signal charges $Q_E$ leak to the semiconductor substrate so that the signal charge amount in the photodiode $PD_E$ reduces more than the signal charge amount photo-excited and stored therein the exposure period $\tau_{ON}$.

This leak phenomenon may be ascribed to thermal emission of signal charges in the photodiode $PD_E$, because of the thermal emission, the signal charges passing over the potential barrier between the photodiode $PD_E$ and semiconductor substrate and flowing toward the semiconductor substrate. A current I converted from the charge amount leaked from the photodiode $PD_E$ to the semiconductor substrate is theoretically expressed by:

$$I \propto \exp(-qVbar/kT)$$

where Vbar is a potential of the potential barrier, q is a signal charge, k is the Voltzmann's constant, and T is an absolute temperature.

The signal charges in the photodiode $PD_O$ are rarely subject to the leak phenomenon, because they are read first during the odd field read period $\tau_1$. On the other hand, the signal charges in the photodiode $PD_E$ are influenced by the leak phenomenon, because they are stored until the odd field read period $\tau_1$ finishes and they are leaked during this store period.

Therefore, an amount (hereinafter called a saturated charge amount) of signal charges capable of being stored in the photodiode $PD_O$ of the odd field becomes substantially different from a saturated charge amount of signal charges capable of being stored in the photodiode $PD_E$ of the even field, resulting in a difficulty of forming a clear frame image. This problem becomes conspicuous when a still image is formed.

A general movie camera having a CCD image pickup device continuously repeats exposure and signal charge read. Therefore, photodiodes of both the odd and even fields operate under the same exposure and signal read conditions. The saturated charge amounts of the odd and even fields do not therefore become different, and the problem of different saturated charge amount between odd and even fields will not occur.

However, in an electronic still camera having a shutter for forming a still image, the shutter is closed after exposure and signal charges of the odd and even fields are read at different timings under the condition of no exposure light. Therefore, during the odd field read period before the even field read period, the amount of signal charges of the even field under a standby state reduces because of the leak phenomenon. There arises therefore the problem of different saturated charge amounts between odd and even fields.

As above, the influence of the leak phenomenon poses a significant problem for a CCD image pickup device of the type that fields are read under the condition of shielded incidence light or no incidence light.

Next, an overflow drain will be described. A transfer gate is provided between each photodiode and an adjacent vertical transfer path. By controlling the level of the channel barrier under the transfer gate, signal charges photo-excited and stored in the photodiode can be transferred to the vertical transfer path.

Specifically, signal charges corresponding in amount to an object illuminance can be photo-excited and stored in each photodiode, by raising the channel barrier under the transfer gate. In reading the signal charges after the exposure, the channel barrier under the transfer gate is lowered once to transfer the signal charges stored in the photodiode, and then the channel barrier is again raised. In this manner, the signal charges are transferred by the vertical and horizontal transfer paths.

A so-called sensor blooming phenomenon may occur if only the channel barrier under the transfer gate is controlled. As a countermeasure for this phenomenon, an overflow drain is formed by using a potential barrier different from that under the transfer gate.

If the overflow drain is not formed, excessive charges generated upon incidence of strong (excessive) light upon a photodiode pass over the channel barrier under the transfer gate and leak into the vertical transfer path. This phenomenon is called a sensor blooming phenomenon. If an image is reproduced from image signals read under such conditions, vertical stripes appear on the reproduced image and the image quality is lowered.

In order to avoid this, the overflow drain is formed adjacent to each photodiode. During exposure, the level $H_{OFD}$ of a potential barrier between the overflow drain and photodiode is set lower than the level $H_{TG}$ of the channel barrier under the transfer gate, so that excessive charges are flowed toward the overflow drain in order not to leak the excessive charges to the vertical transfer path.

A conventional CCD image pickup device of an interline transfer type is, however, associated with some problem if exposure is performed under the condition that the level $H_{OFD}$ of a potential barrier between the overflow drain and photodiode is set lower than the level $H_{TG}$ of the channel barrier under the transfer gate.

Specifically, although it is effective for preventing occurrence of the sensor blooming phenomenon to perform the exposure satisfying a relation of $H_{TG} > H_{OFD}$ between the channel barrier and potential barrier, signal charges having the level higher than a difference between the potential barrier level $H_{OFD}$ and the channel barrier level $H_{TG}$ are always drained to the overflow drain. Therefore, the saturated charge amount of the photodiode reduces by an amount corresponding to a barrier level difference $|H_{TG} - H_{OFD}|$. It is therefore difficult to manufacture a CCD image pickup device having excellent performances such as wide dynamic range with high sensitivity.

SUMMARY OF THE INVENTION

It is an object of the present invention to provide a solid state image pickup device capable of uniformalizing saturated charge amounts of all light reception elements.

It is another object of the present invention to provide a solid state image pickup device capable of providing all light reception elements with an increased saturated charge amount.

According to one aspect of the present invention, there is provided a method of controlling a solid state image pickup device of an interlace type the solid state image pickup device including a semiconductor substrate formed with at least: light reception elements disposed in two-dimensional rows and columns for performing charge generation and accumulation through photoelectric conversion, the light reception elements being assigned to first and second fields; a plurality of vertical charge transfer paths for transferring the charges generated by the light reception elements, each vertical transfer path being provided in correspondence with each light reception column; overflow drain regions capable of draining charges in the light reception elements; a first semiconductor region between each light reception element and a corresponding vertical charge transfer path; a second semiconductor region between each light reception element and a corresponding overflow drain region; and a transfer gate provided for each light reception element for transferring charges in each light reception element to a corresponding vertical charge transfer path by controlling a potential of the first semiconductor region, the transfer gate being formed over the first semiconductor region with an insulating film being interposed therebetween, and the method comprising the steps of: (a) generating and accumulating charges in each light reception element in the first and second fields, by setting a potential of the second semiconductor region to a first potential and by setting a potential of the first semiconductor region higher than the first potential; (b) transferring the charges in each light reception element in the first field to the vertical charge transfer paths, by lowering the potential of the first semiconductor region corresponding to the light reception element in the first field; (c) transferring the charges corresponding to the first field in the vertical charge transfer paths, by setting a potential of the second semiconductor region higher than a second potential higher than the first potential; (d) transferring the charges in each light reception element in the second field to the vertical charge transfer paths, by lowering the potential of the first semiconductor region corresponding to the light reception element in the second field; and (e) transferring the charges corresponding to the first field in the vertical charge transfer paths.

The potential of the second semiconductor region between each light reception element and a corresponding overflow drain is set higher than that during charge generation in each light reception element, at least during a first field read operation. Therefore, until the second field read operation starts, it becomes difficult for signal charges stored in the light reception elements to pass over, because of thermal emission of charges, the potential barrier of the second semiconductor region and leak to the overflow drain region during the first field read operation. The saturated charge amounts of the light reception elements in the first and second fields can therefore be uniformalized.

The solid state image pickup device may comprises light interception/transmission means for switching between interception and transmission of incidence light to the light reception elements, wherein: the step (b) generates charges in the light reception elements in a state that the incidence light to the light reception elements is transmitted; and the step (c) transfers the charges in a state that the incidence light to the light reception elements is intercepted.

Charges of the light reception elements of the first field are transferred in the state that incidence light to the light reception elements is intercepted by the light transmission/interception means. Accordingly, until the second field read operation starts, signal charges stored in the light reception elements are hard to pass over the potential barrier of the second semiconductor region and leak to the overflow drain region because of thermal emission of the signal charges. The saturated charge amounts of the light reception elements in the first and second fields can therefore be uniformalized.

Since the saturated charge amounts of all light reception elements can be uniformalized, a frame image reproduced from image signals obtained by the first and second field read operations has less variation in luminance and has high quality.

By applying a solid state image pickup device of the invention to an electronic still camera or the like provided with light transmission/interception means, a frame image having higher quality than a conventional camera can be obtained.

BRIEF DESCRIPTION OF THE DRAWINGS

FIGS. 2A to 2C are a plan view, a cross sectional view, and a graph showing the structure and potential profile of the solid state image pickup device shown in FIG. 1.

DETAILED DESCRIPTION OF THE PREFERRED EMBODIMENTS

Solid state image pickup devices according to embodiments of the invention will be described by taking as an example a CCD image pickup device of an interline transfer type.

(1st Embodiment)

A solid state image pickup device of the first embodiment is constituted of a CCD image pickup device of an interline transfer type (hereinafter described as ILCCD) and its control circuit. The solid image pickup device is used with an electronic still camera. ILCCD is mounted behind a shutter means (light transmission/interception means) of the electronic still camera, to perform an image pickup operation.

Specific examples of the shutter means may be a mechanical shutter such as a focal plane shutter, an electro-optic device such as a liquid crystal shutter which electrically turns on and off incidence light transmission, a reflection mirror pivotally mounted in front of a light reception area of ILCCD, or the like. In this embodiment, a mechanical shutter is used by way of example.

Figure 1:
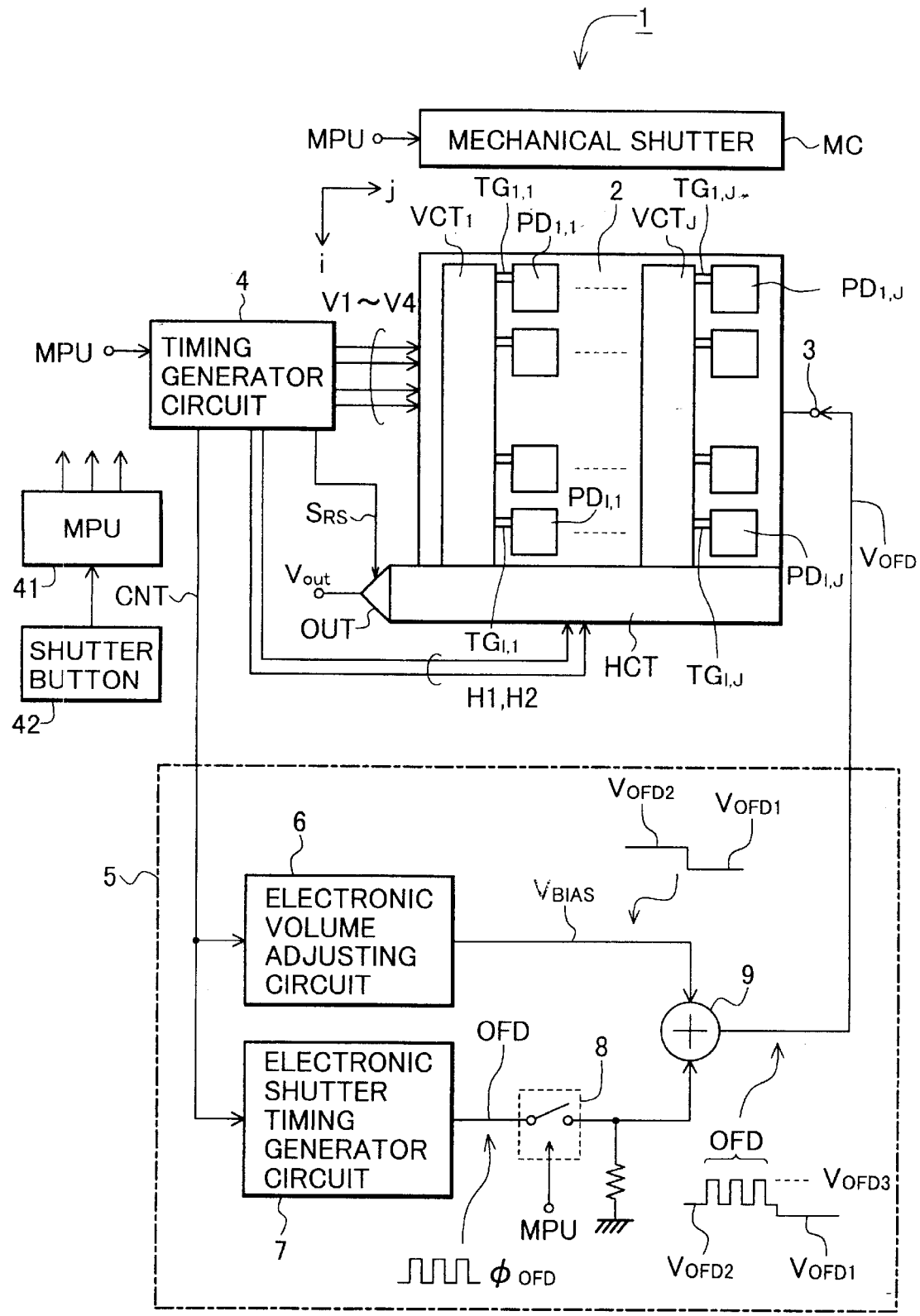
FIG. 1 is a block diagram showing the structure of a solid state image pickup device according to a first embodiment of the invention.

FIG. 1 is a block diagram showing the structure of the solid state image pickup device with ILCCD 1 according to the first embodiment. The solid state image pickup device is mounted on an electronic still camera.

Referring to FIG. 1, ILCCD 1 is integrally formed on a single semiconductor substrate by semiconductor integrated circuit manufacture technologies. Formed in a light reception area 2 of ILCCD 1 are I×J photodiodes (light reception elements) $PD_{1,1}$ to $PD_{I,J}$ disposed in a two-dimensional matrix form along a vertical direction i and a horizontal direction j and J vertical transfer paths $VCT_1$ to $VCT_J$ juxtaposed with the photodiodes $PD_{1,1}$ to $PD_{I,J}$ at the left side thereof via transfer gates $TG_{1,1}$ to $TG_{I,J}$. Of the photodiodes $PD_{1,1}$ to $PD_{I,J}$, those on odd lines constitute an odd field light reception element group and those on even lines constitute an even field light reception element group. One ends of the vertical transfer paths $VCT_1$ to $VCT_J$ are connected to a horizontal transfer path HCT, and one end of the horizontal transfer path HCT is connected to an output circuit OUT. A terminal 3 for applying a substrate voltage control signal $V_{OFD}$ is connected to the bottom surface of ILCCD 1. Of the light reception area 2, the whole area excepting the light incidence surface (light reception surface) is covered with a light shielding film (aluminum film) to suppress formation of unnecessary charge carriers.

In addition to ILCCD 1, the solid state image pickup device has a timing generator circuit 4 and a substrate voltage control circuit 5. The substrate voltage control circuit 5 is constituted of an electronic volume adjusting circuit 6, an electronic shutter timing generator circuit 7, an analog switch 8, and an adder circuit 9.

The electronic still camera has a microprocessor (MPU) 41 in addition to the solid state image pickup device. In response to an instruction from MPU 41 of the electronic still camera, the timing generator circuit 4 generates: four-phase drive signals V1 to V4 for making the vertical transfer paths $VCT_1$ to $VCT_J$ execute a vertical transfer operation synchronously with a signal of one horizontal scan period (1H period); two-phase drive signals H1 and H2 for making the horizontal transfer path HCT execute a horizontal transfer operation synchronously with a signal of a horizontal blanking period; a timing control signal $S_{RS}$ for controlling a set/reset operation of the output circuit OUT; and a timing control signal CNT for controlling the operation of the substrate voltage control circuit 5.

During exposure, signal charges stored in the photodides $PD_{1,1}$ to $PD_{I,J}$ are read to the vertical transfer paths $VCT_1$ to $VCT_J$ via the transfer gates $-TG_{1,1}$ to $TG_{I,J}$. During the odd field read period and even field read period, the vertical transfer paths $VCT_1$ to $VCT_J$ and horizontal transfer path HCT perform vertical and horizontal transfer operations synchronously with the four-phase drive signal V1 to V4 and two-phase drive signals H1 and H2.

More specifically, during the odd field read period, the vertical transfer paths $VCT_1$ to $VCT_J$ transfer, in the vertical direction, signal charges photo-excited and stored in the photodiodes of the odd field synchronously with the four-phase drive signal V1 to V4. The signal charges vertically transferred for each line are transferred in the horizontal direction by the horizontal transfer path HCT synchronously with the two-phase drive signals H1 and H2. These vertical and horizontal transfer operations are repeated to read the pixel signal Vout of the odd field from the output circuit OUT.

During the even field read period, the vertical transfer paths $VCT_1$ to $VCT_J$ transfer, in the vertical direction i, signal charges photo-excited and stored in the photodiodes of the even field synchronously with the four-phase drive signal V1 to V4. The signal charges vertically transferred for each line are transferred in the horizontal direction j by the horizontal transfer path HCT synchronously with the two-phase drive signals H1 and H2. These vertical and horizontal transfer operations are repeated to read the pixel signal Vout of the even field from the output circuit OUT.

The microprocessor 41 controls a mechanical shutter MC in accordance with an operation state of a shutter button 42. In response to an instruction from the microprocessor 41, the mechanical shutter MC is mechanically opened or closed. When the mechanical shutter MC is opened, incidence light to photodiodes passes therethrough, and when it is close, it is intercepted. The timing generator circuit 4 output the signal CNT for opening/closing the mechanical shutter MC.

In response to the timing control signal CNT, the electronic volume adjusting circuit 6 outputs and supplies a reference voltage signal $V_{BIAS}$ to the adder circuit 9, the reference voltage signal having binary levels of d.c. voltages $V_{OFD1}$ and $V_{OFD2}$ ($V_{OFD1} < V_{OFD2}$). The timing control signal CNT indicates an open/close state of the mechanical shutter MC of the electronic still camera. In accordance with this signal CNT, the electronic volume adjusting circuit 6 outputs the reference voltage signal $V_{BIAS}$ of the d.c. voltage $V_{OFD2}$ when the mechanical shutter MC is open, and of the d.c. voltage $V_{OFD1}$ when the mechanical shutter MC is closed.

In response to the timing control signal CNT supplied from the timing generator circuit 4, the electronic shutter timing generator circuit 7 outputs an electronic shutter signal OFD which is constituted of a set of three rectangular pulses each changing its high level and low level synchronously with a signal of the one horizontal scan period (1H period). The timing control signal CNT contains information on the timings of the odd and even field read periods, in addition to the information on the open/close state of the mechanical shutter MC. In accordance with this timing information, the electronic shutter timing generator circuit 7 outputs the electronic shutter signal OFD synchronously with the signal of each field read period. The high level of the rectangular pulse is set to $\phi_{OFD}$ ($\phi_{OFD} > V_{OFD2} - V_{OFD1}$).

In accordance with an instruction from the microprocessor (MPU) 41, the analog switch 8 turns on or off to supply or not to supply the electronic shutter signal OFD to the adder circuit 9. While the mechanical shutter MC is open, the analog switch 8 becomes conductive so that the electronic shutter signal OFD is supplied to the adder circuit 9, whereas while the mechanical shutter MC is closed, the analog switch 8 becomes non-conductive so that the electronic shutter signal OFD is not supplied to the adder circuit 9.

The adder circuit 9 receives the reference voltage signal $V_{BIAS}$ and electronic shutter signal OFD, generates the substrate voltage control signal $V_{OFD}$ which is the electronic shutter signal OFD superposed upon the reference voltage signal $V_{BIAS}$, and supplies it to the terminal 3.

While the mechanical shutter MC is open, the reference voltage signal $V_{BIAS}$ of the d.c. voltage $V_{OFD2}$ and the electronic shutter signal OFD are supplied to the adder circuit 9, and the substrate voltage control signal $V_{OFD}$, which is the electronic shutter signal OFD superposed upon the d.c. voltage $V_{OFD2}$, is supplied to the terminal 3. Therefore, while the mechanical shutter MC is open, the substrate voltage control signal $V_{OFD}$ has a base voltage level of $V_{OFD2}$ and a largest amplitude of $V_{OFD3}$ (=$V_{OFD2}$+$\phi_{OFD}$).

While the mechanical shutter MC is closed, the reference voltage signal $V_{BIAS}$ of the d.c. voltage $V_{OFD1}$ is supplied to the adder circuit 9. In this case, since the electronic shutter signal OFD is not supplied to the adder circuit 9, the substrate voltage control signal $V_{OFD}$ equal to the d.c. voltage $V_{OFD1}$ is supplied to the terminal 3.

Figure 2A:
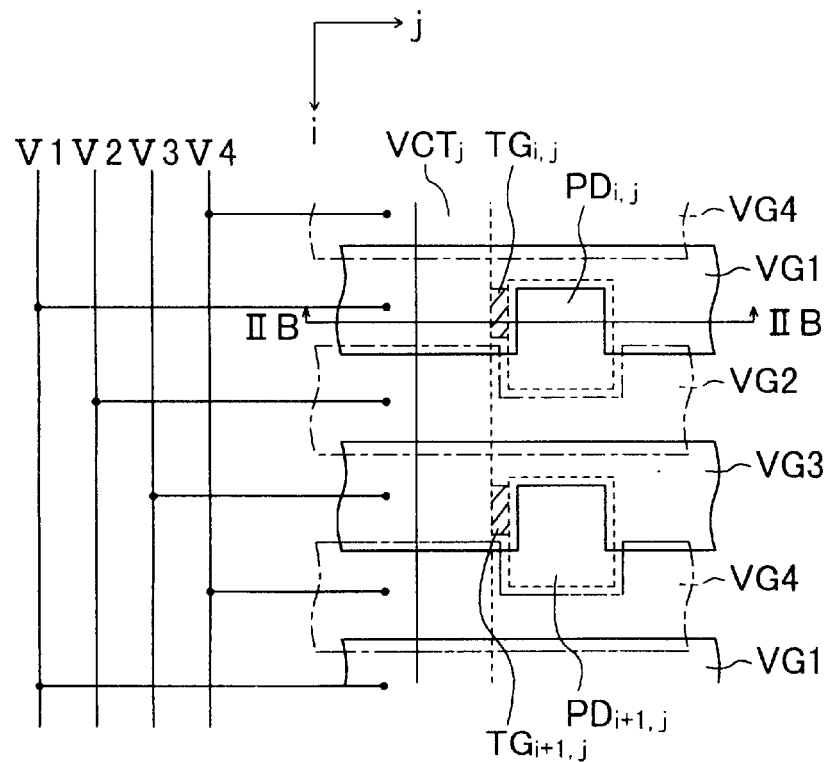

FIG. 2A is a plan view of a representative layout of a photodiode $PD_{I,J}$ of the odd field, a photodiode $PD_{I+1,j}$ of the even field, and a vertical transfer path $VCT_J$ adjacent to the photodiode.

Referring to FIG. 2A, a set of four transfer electrodes VG1 to VG4 of an overlapping gate structure is disposed repetitively in the vertical direction i over the vertical transfer path $VCT_J$. The four-phase drive signals V1 to V4 from the timing generator circuit 4 are applied to the corresponding transfer electrodes VG1 to VG4. As the four-phase drive signals V1 to V4 change at predetermined timings in a predetermined voltage range, potential wells are formed in the vertical transfer path $VCT_J$ in accordance with the voltage change of the four-phase drive signals V1 to V4. In accordance with a change in the potential wells, signal charges are separated in the unit of pixel and transferred in the vertical direction i.

Figure 8A:
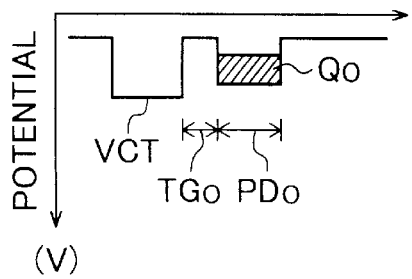
FIGS. 8AA to 8EB are graphs showing potential profiles illustrating the operation of a conventional solid state image pickup device.
Figure 8A:
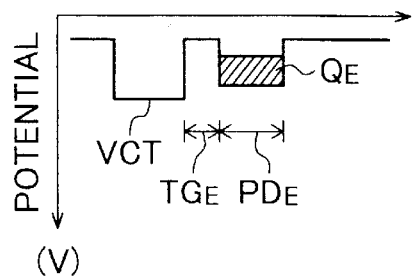
Figure 8B:
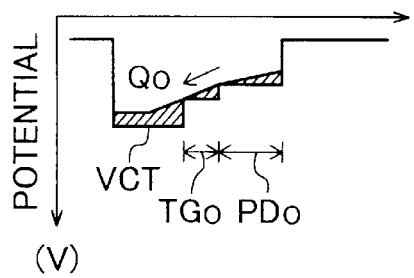
Figure 8B:
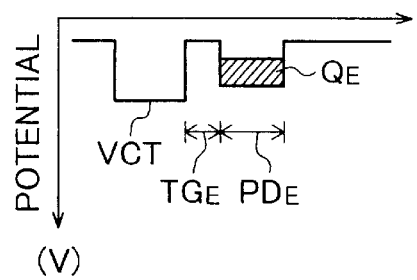
Figure 8C:
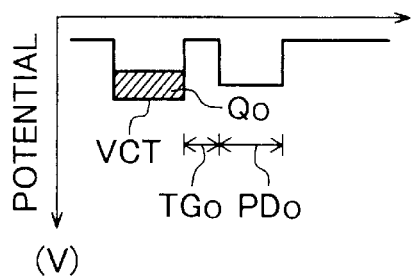
Figure 8C:
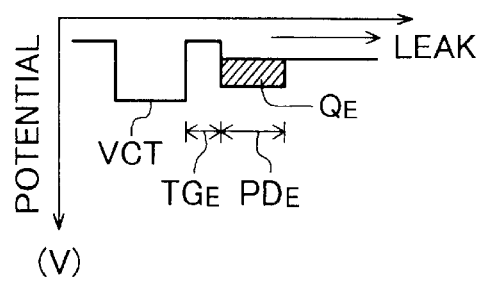
Figure 8D:
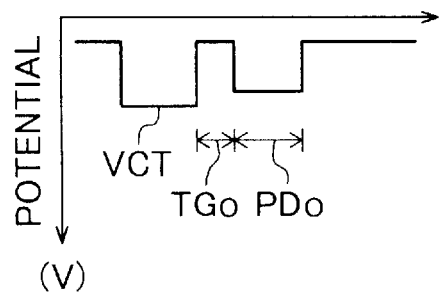
Figure 8D:
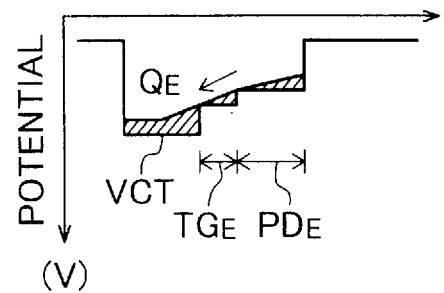
Figure 8E:
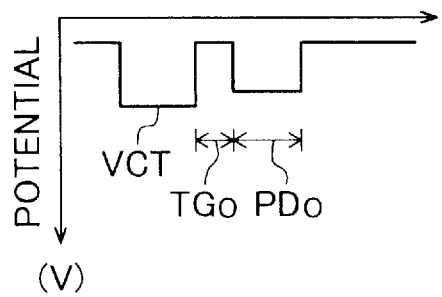
Figure 8E:
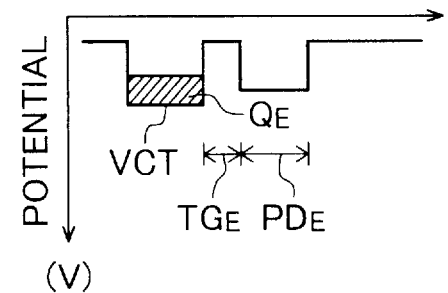

The transfer gate $TG_{I,J}$ formed between the photodiode $PD_{I,J}$ and vertical transfer path $VCT_J$ is a portion of the first transfer electrode VG1. As a transfer pulse having a level higher than a predetermined threshold voltage Vth (FIG. 8B) is applied as the drive signal V1 to the transfer electrode VG1, the potential barrier (channel barrier) under the transfer gate $TG_{I,J}$ lowers so that the channel between the photodiode $PD_{I,J}$ and vertical transfer path $VCT_J$ becomes conductive.

The transfer gate $TG_{I+1,j}$ formed between the photodiode $PD_{I+1,j}$ and vertical transfer path $VCT_J$ is a portion of the first transfer electrode VG3. As a transfer pulse having a level higher than the predetermined threshold voltage Vth is applied as the drive signal V3 to the transfer electrode VG3, the channel barrier under the transfer gate $TG_{I+1,j}$ lowers so that the channel between the photodiode $PD_{I+1,j}$ and vertical transfer path $VCT_J$ becomes conductive.

Figure 2B:
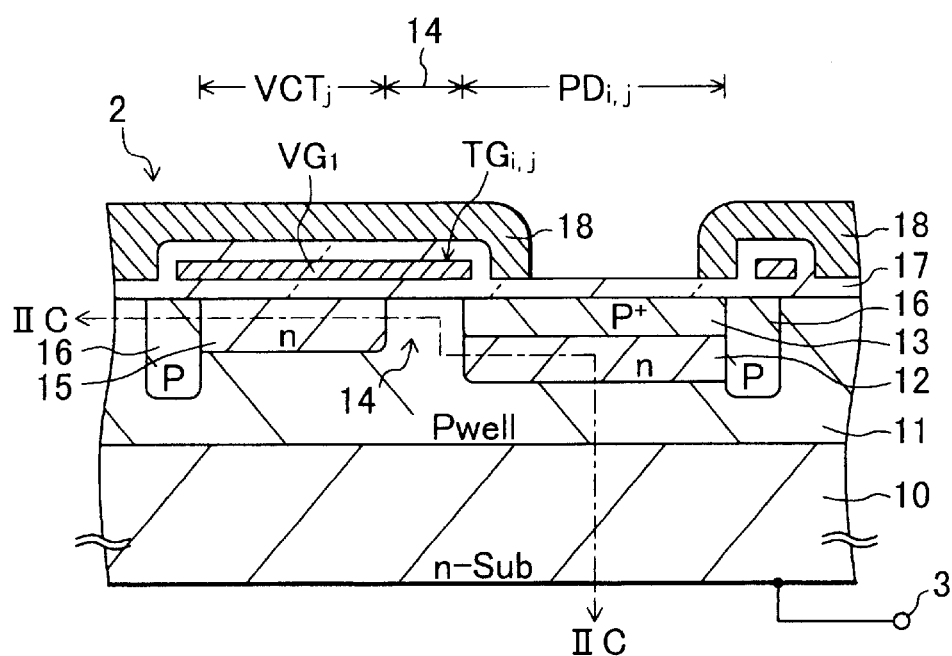

FIG. 2B is a cross sectional view taken along one-dot chain line IIB—IIB of FIG. 2A and showing the structure of the vertical transfer path $VCT_J$, transfer gate $TG_{I,J}$, photodiode $PD_{I,J}$, and their peripheral elements.

Referring to FIG. 2B, an n-type semiconductor region 12 and a $p^+$-type semiconductor region 13 constituting the photodiode $PD_{I,J}$ are formed in a p-type well 11 formed on an n-type semiconductor substrate 10. The n-type region 12, lower p-type region 11, and upper $p^+$-type region 13 constitute the photodiode. To the left of these semiconductor regions 12 and 13, an n-type semiconductor region 15 constituting the vertical transfer path $VCT_J$ is formed, with an interposed region 14 constituting the channel region under the transfer gate $TG_{I,J}$ being formed.

A channel stopper 16 is formed in the p-type well 11, the channel stopper being made of a p-type semiconductor region which surrounds the semiconductor regions 12, 13, and 15 and the interposed region 14. This channel stopper 16 electrically separates adjacent columns to thereby prevent lateral leak of signal charges in the photodiode $PD_{I,J}$, vertical transfer path $VCT_J$, and transfer gate $TG_{I,J}$.

The transfer electrode VG1 made of polysilicon is formed over the n-type semiconductor region 15 and interposed region 14, with an interlayer insulating film (silicon oxide film) 17 being interposed therebetween. A partial area of the light reception area 2 excepting a predetermined area of the $p^+$-type semiconductor region 2 is covered with a light shielding film (aluminum film) 18. A metal deposition film is formed on the bottom surface of the n-type semiconductor substrate 10 and the terminal 3 is connected to the metal deposition film.

FIG. 2C is a graph showing a potential profile along one-dot chain line IIC—IIC of FIG. 2B. This potential profile relative to electrons shows potentials along the substrate horizontal direction in the vertical transfer path $VCT_J$, in the interposed region 14, and in a partial area of the photodiode $PD_{I,J}$, and along the substrate depth direction from the photodiode $PD_{I,J}$ to the n-type semiconductor substrate 10.

Referring to FIG. 2C, the channel stopper 16 in the p-type semiconductor region forms a potential barrier P1 having a highest fixed level, and the p-type well 11 under the photodiode $PD_{I,J}$ forms a potential barrier P2. Formed between these potential barriers P1 and P2 are a potential well P3 of the vertical transfer path $VCT_J$, a channel barrier P4 of the interposed region 14, and a potential well P5 of the n-type semiconductor region 12.

If the drive signal V1 is the predetermined threshold voltage Vth or lower, the channel barrier P4 under the transfer gate $TG_{I,J}$ rises as indicated by a solid line in FIG. 2C. If the drive signal V1 is a transfer pulse higher than the threshold voltage Vth, the channel barrier P4 under the transfer gate $TG_{I,J}$ becomes lower than the potential well P5 of the photodiode as indicated by a broken line shown in FIG. 2C. Therefore, signal charges in the photodiode $PD_{I,J}$ pass over the low channel barrier P4 and are transferred to the vertical transfer path $VCT_J$.

The level of the potential barrier P2 becomes lower as the voltage of the substrate voltage control signal $V_{OFD}$ becomes higher (potential becomes lower), and vice versa.

While the drive signal V1 changes in a predetermined voltage range equal to or lower than the threshold voltage Vth (refer to FIG. 8), signal charges are transferred in the vertical transfer path $VCT_J$.

All the photodiodes $PD_{1,1}$ to $PD_{I,J}$, interposed regions 14, and vertical transfer paths $VCT_1$ to $VCT_J$ have a potential profile similar to the above.

In this embodiment, the drive signals V1 to V4 and the voltage of the substrate voltage control signal $V_{OFD}$ are controlled to adjust the level of each channel barrier under the transfer gate $TG_{1,1}$ to $TG_{I,J}$. Through this adjustment, the following operations are performed. Namely, unnecessary charges left in the photodiodes $PD_{1,1}$ to $PD_{I,J}$ are drained to the n-type semiconductor substrate 10, charges are generated and stored in the photodiodes $PD_{1,1}$ to $PD_{I,J}$, signal charges stored in the photodiodes $PD_{1,1}$ to $PD_{I,J}$ are transferred to the vertical transfer paths $VCT_1$ to $VCT_J$, and the signal charges in the vertical transfer paths are vertically transferred to the horizontal transfer path HCT.

Figure 3:
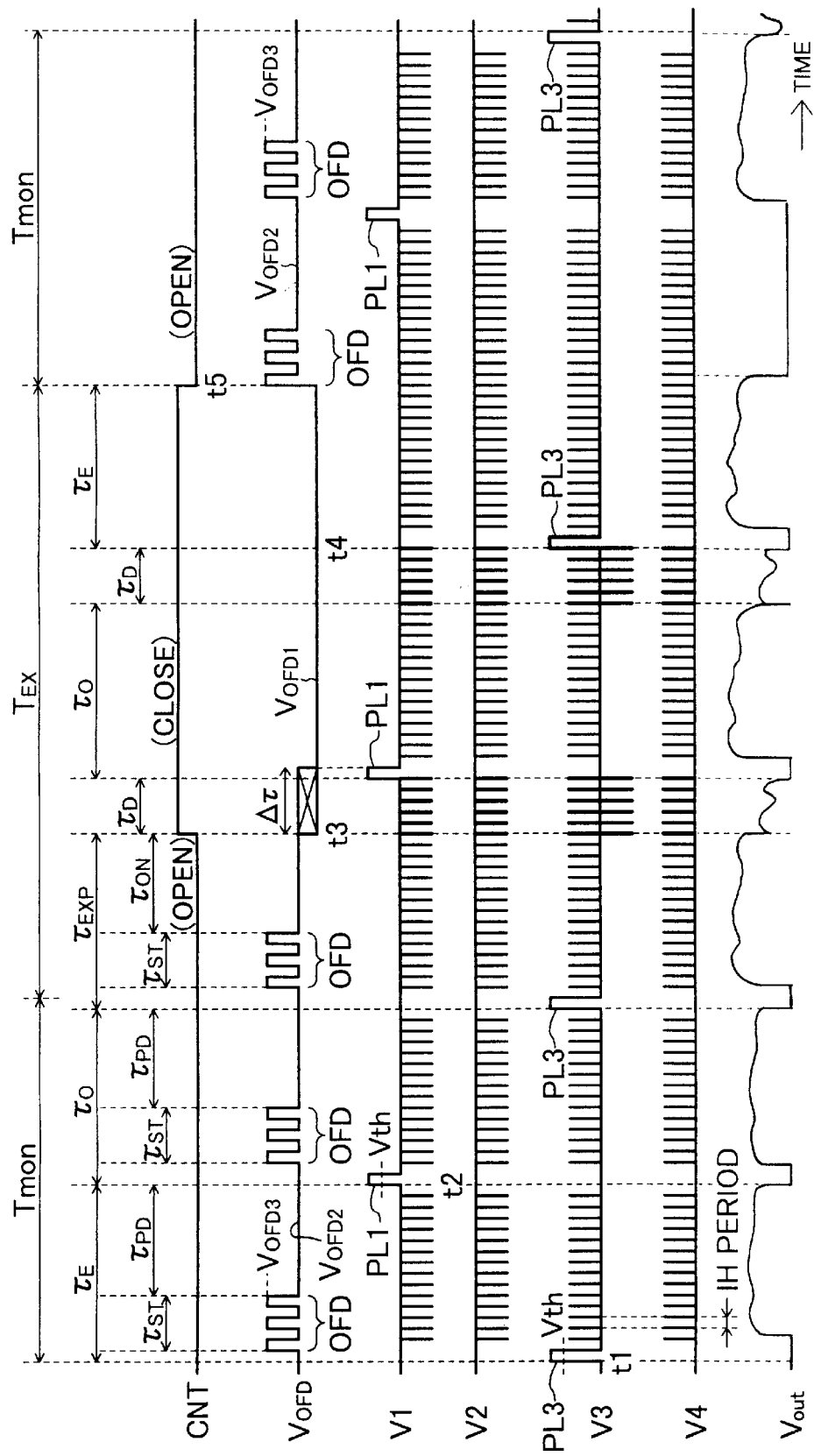
FIG. 3 is a timing chart illustrating the operation of the solid state image pickup device of the first embodiment applied to an electronic still camera.
Figure 4A:
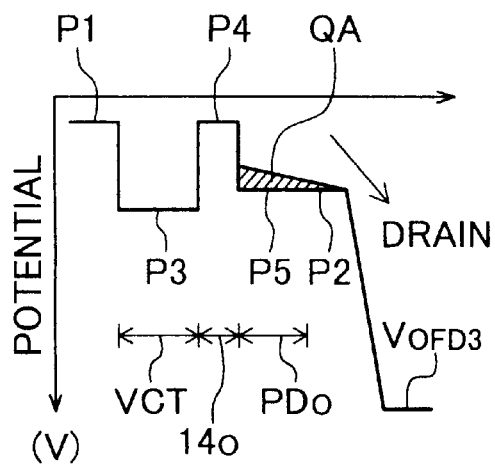
FIGS. 4AA to 4FB are graphs showing potential profiles illustrating the operation of the image pickup device of the first embodiment.
Figure 4A:
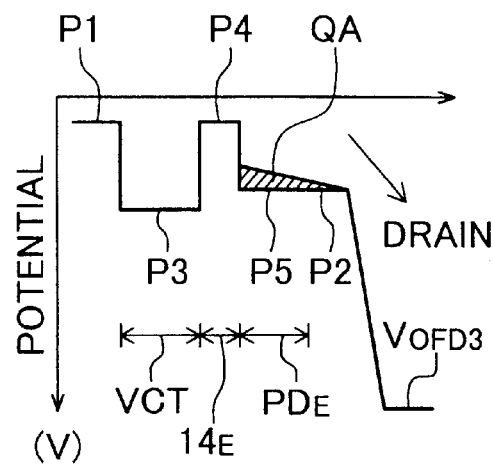

Next, with reference to FIGS. 3 and FIGS. 4AA to 4FB, the operation of the electronic still camera with ILCCD 1 will be described. FIG. 3 is a timing chart illustrating the operation of ILCCD 1. FIGS. 4AA to 4FB show a change in the potential profile formed in ILCCD 1 during a photographing mode period $T_{EX}$ to be described later. In FIGS. 4AA to 4FB, signal charges are shown hatched. The potential profiles shown in FIGS. 4AA, 4BA, 4CA, 4DA, 4EA, and 4FA are used for reading signal charges $Q_O$ of the odd field, and the potential profiles shown in. FIGS. 4AB, 4BB, 4CB, 4DB, 4EB, and 4FB are used for reading signal charges $Q_E$ of the even field. The photodiodes and interposed regions in the odd field are represented by $PD_O$ and $14_O$, and the photodiodes and interposed regions in the even field are represented by $PD_E$ and $^{14}E$. Each or all of the vertical transfer paths $VCT_1$ to $VCT_J$ are represented by VCT.

The electronic still camera has a monitor (moving image) mode in which an object is observed in real time on a display without actually photographing it and a photographing mode in which an object image is recorded as a still image.

Referring to FIG. 3, during the monitor mode period Tmon, an object is observed by repeating the even field read period $\tau_E$ and the odd field read period $\tau_O$ while the mechanical shutter is opened. Until the timing control signal CNT indicating the open state of the mechanical shutter is supplied to the substrate voltage control circuit 5 (FIG. 1) and the shutter button switch 42 of the electronic still camera is depressed, the reference voltage signal $V_{BIAS}$ of the electronic volume adjusting circuit 6 shown in FIG. 1 takes the voltage $V_{OFD2}$.

In the even field read period $\tau_E$ in the monitor mode period Tmon, a transfer pulse PL3 equal to or larger than the threshold voltage Vth is first supplied as the drive signal V3 among the four-phase drive signals V1 to V4 during the vertical blanking period (refer to a timing t1). Therefore, as indicated by the broken line of FIG. 2C, the channel barriers P4 under the transfer gates of the even field become lower than the potential P5 of the photodiodes $PD_{1,1}$ to $PD_{I,J}$, so that signal charges stored in the photodiodes of the even field are transferred to the vertical transfer paths $VCT_1$ to $VCT_J$.

During periods $\tau_{ST}$ and $\tau_{PD}$ until the even field read period $\tau_E$ is terminated, vertical transfer operations are performed by the vertical transfer paths $VCT_1$ to $VCT_J$ synchronously with the four-phase drive signals V1 to V4 and horizontal transfer operations are performed by the horizontal transfer path HCT synchronously with the two-phase drive signals H1 and H2, to thereby output the pixel signal Vout of the even field.

During the period $\tau_{ST}$ after the timing t1, the electronic shutter timing generator circuit 7 outputs the electronic shutter signal OFD. Therefore, the substrate voltage control signal $V_{OFD}$ which is the voltage $V_{OFD2}$ superposed upon the electronic shutter signal OFD is supplied to the n-type semiconductor substrate 10. As the substrate voltage control signal $V_{OFD}$ is applied to the n-type semiconductor substrate 10, the potential barrier P2 shown in FIG. 2C becomes sufficiently lower than the potential P5 of the photodiode. Therefore, all unnecessary charges left in the photodiodes $PD_{1,1}$ to $PD_{I,J}$ are drained to the n-type semiconductor substrate 10. During this unnecessary charge drain period $\tau_{ST}$, the channel barrier P4 becomes sufficiently high so that the channels between the vertical transfer paths $VCT_1$ to $VCT_J$ and photodiodes $PD_{1,1}$ to $PD_{I,J}$ are made non-conductive and the vertical transfer operations of the vertical transfer paths $VCT_1$ to $VCT_J$ can be performed normally.

During the period $\tau_{PD}$ until the even field read period $\tau_E$ is terminated after the unnecessary charge drain period $\tau_{ST}$, the substrate voltage control signal $V_{OFD}$ takes the voltage $V_{OFD2}$. Therefore, the potential barrier P2 and channel barrier P4 under the transfer gate $TG_{1,1}$ to $TG_{I,J}$ become higher than the potential P5 of the photodiode, to thus allow the photodiodes $PD_{1,1}$ to $PD_{I,J}$ to perform the next exposure and charge accumulation. During this exposure period $\tau_{PD}$, the substrate voltage control signal $V_{OFD}$ of the voltage $V_{OFD}$ makes the potential barrier P2 slightly lower than the channel barrier P4. Therefore, even if excessive charges are generated upon incidence of high illuminance light upon the photodiodes $PD_{1,1}$ to $PD_{I,J}$, the excessive charges are drained to the n-type semiconductor substrate 10 via the potential barrier P2 lower than the channel barrier P4 and do not leak to the vertical transfer path $VCT_1$ to $VCT_J$. Accordingly, the signal charges in the vertical transfer paths $VCT_1$ to $VCT_J$ are vertically transferred without being added with the excessive charges, and the normal exposure and charge accumulation are performed in the photodiodes $PD_{1,1}$ to $PD_{I,J}$.

As above, in the even field read period $\tau_E$, after signal charges in the photodiodes of the even field are transferred to the vertical transfer paths $VCT_1$ to $VCT_J$ during the vertical blanking period (refer to the timing t1), the vertical and horizontal transfer operations of the signal charges of the even field are performed during the periods $\tau_{ST}$ and $\tau_{PD}$. In parallel to this charge transfer, unnecessary charges in the photodiodes are drained during the period $\tau_{ST}$ and the exposure and charge accumulation of the photodiodes are performed during the period $\tau_{PD}$.

Since excessive charges are not mixed with the signal charges during the vertical transfer during the exposure period $\tau_{PD}$, the pixel signal Vout with less noise components can be output. By reproducing the pixel signal Vout and displaying the image on a liquid crystal monitor or the like of the electronic still camera, an object image of high quality can be observed.

Also during the odd field read period $\tau_O$ of the monitor mode period Tmon, similar operations during the even field read period $\tau_E$ are performed. Specifically, a transfer pulse PL1 equal to or larger than the threshold voltage Vth is supplied as the drive signal V1 during the vertical blanking period (refer to a timing t2). Therefore, signal charges stored in the photodiodes of the odd field are transferred to the vertical transfer paths $VCT_1$ to $VCT_J$. Thereafter, during the periods $\tau_{ST}$ and $\tau_{PD}$ of the odd field read period $\tau_O$, charge transfer of the odd field is performed. In parallel to this charge transfer, unnecessary charges are drained during the period $\tau_{ST}$ and the next exposure and charge accumulation are performed during the period $\tau_{PD}$.

Also during the odd field read period $\tau_O$, since excessive charges are not mixed with the signal charges during the vertical transfer during the exposure period $\tau_{PD}$, the pixel signal Vout with less noise components can be output. By reproducing the pixel signal Vout and displaying the image on a liquid crystal monitor or the like of the electronic still camera, an object image of high quality can be observed.

When the shutter button switch 42 of the electronic still camera is depressed at any timing during the monitor mode period Tmon, the photographing mode period $T_{EX}$ starts synchronously with the next field read period $\tau_{EXP}$.

If the shutter button switch 42 is depressed during the odd field read period $\tau_O$, the field read period $\tau_{EXP}$ corresponds to the even field read period, whereas if the shutter button switch 42 is depressed during the even field read period $\tau_E$, the field read period $\tau_{EXP}$ corresponds to the odd field read period.

During the field read period $\tau_{EXP}$, the substrate voltage control signal $V_{OFD}$ with the electronic shutter signal OFD being superposed is applied to the n-type semiconductor substrate 10. As shown in FIGS. 4AA and 4AB, the potential barrier P2 becomes sufficiently lower than the potential P5 of the photodiode $PD_{1,1}$ to $PD_{I,J}$. Therefore, all unnecessary charges QA left in the photodiodes $PD_{1,1}$ to $PD_{I,J}$ and shown hatched are drained to the n-type semiconductor substrate 10.

After the unnecessary charges QA are drained, the mechanical shutter MC is closed immediately after the lapse of a period $\tau_{ON}$ corresponding to a shutter speed set in the electronic still camera. This period $\tau_{ON}$ is therefore an exposure time for still image photographing.

During a period $\Delta\tau$, which is a period from a timing t3 when the mechanical shutter MC is closed to a time when the vertical blanking period in the next odd field read period $\tau_O$ is terminated, the substrate voltage control signal $V_{OFD}$ changes from the voltage $V_{OFD2}$ to the voltage $V_{OFD1}$.

Further, during a period $\tau_D$ which is a period from the timing t3 when the mechanical shutter MC is closed to a time when the next vertical blanking period is terminated, the four-phase drive signals V1 to V4 and two-phase drive signals H1 and H2 are speeded up (made to have a shorter period) more than the normal read period to make the vertical transfer paths $VCT_1$ to $VCT_J$ and horizontal transfer path HCT transfer signal charges at high speed. In place of the four-phase drive signals V1 to V4, the vertical transfer paths $VCT_1$ to $VCT_J$ may be driven synchronously with two-phase drive signals to perform a high speed charge transfer.

Figure 4B:
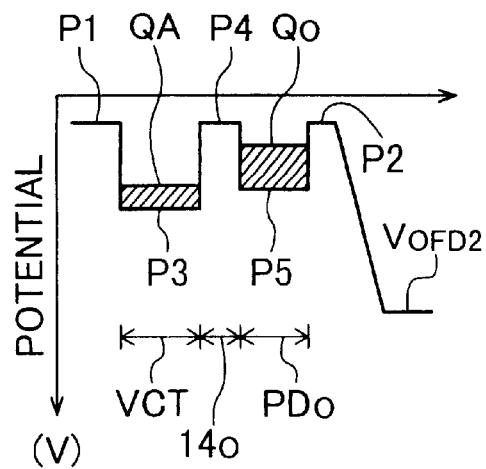
Figure 4B:
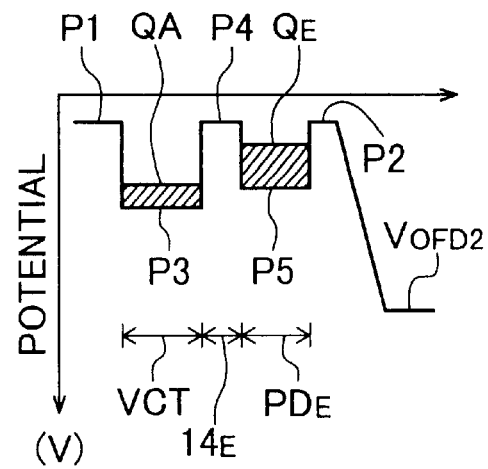

With such high speed charge transfer, as shown in FIGS. 4BA and 4BB, the signal charges $Q_O$ and $Q_E$ shown hatched and photo-excited and stored in the photodiodes $PD_{1,1}$ to $PD_{I,J}$ are maintained stored, and only the unnecessary charges QA shown hatched and left in the vertical transfer paths $VCT_1$ to $VCT_J$ are drained to the external circuit through charge transfer.

Figure 4C:
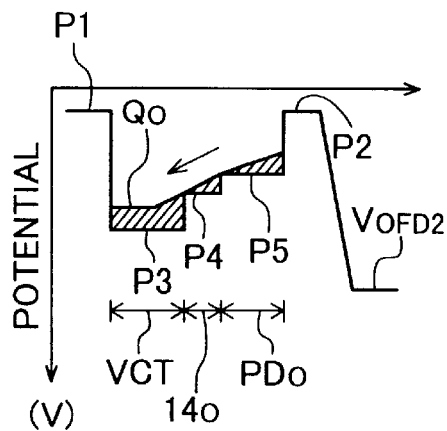
Figure 4C:
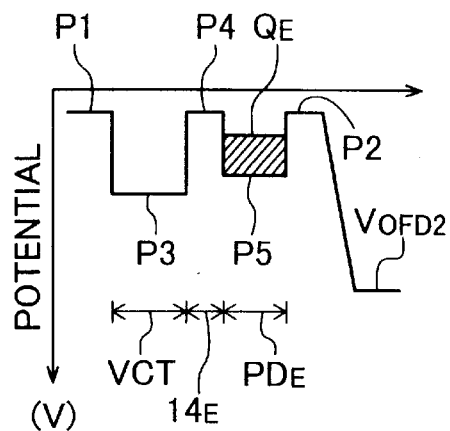

Next, during the vertical blanking period, a transfer pulse PL1 equal to or larger than the threshold voltage Vth is supplied as the drive signal V1 among the four-phase drive signals V1 to V4. Therefore, as shown in FIG. 4CA, the channel barriers P4 under the interposed regions $14_O$ of the odd field become lower than the potential P5 of the photodiodes $PD_O$, so that only the signal charges shown hatched and stored in the photodiodes $PD_O$ of the odd field are transferred to the vertical transfer paths VCT. The channel barriers P4 of the interposed regions $14_E$ of the even field are maintained high as shown in FIG. 4CB, so that the signal charges shown hatched and stored in the photodiodes $PR_E$ of the even field are stored as they are.

Thereafter, during a period until the odd field read period $\tau_O$ is terminated, vertical transfer operations are performed by the vertical transfer paths $VCT_1$ to $VCT_J$ synchronously with the four-phase drive signals V1 to V4 and horizontal transfer operations are performed by the horizontal transfer path HCT synchronously with the two-phase drive signals H1 and H2, to thereby output the pixel signal Vout of the odd field.

Figure 4D:
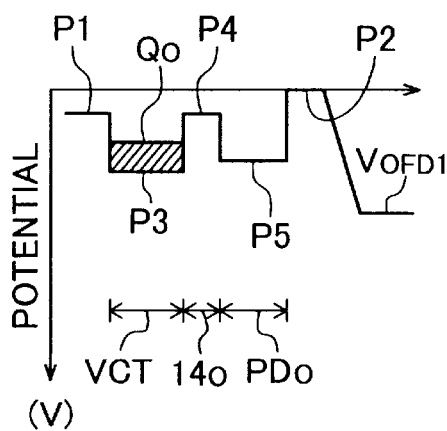
Figure 4D:
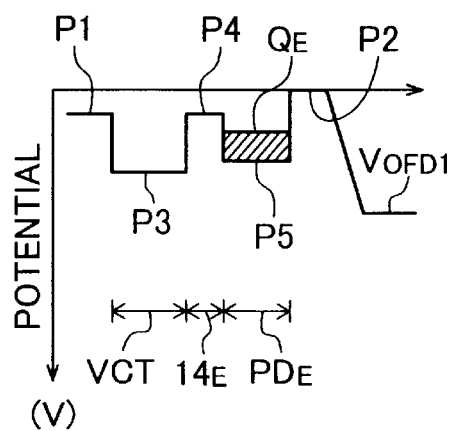

During the period until the odd field read period $\tau_O$ is terminated, the substrate voltage control signal $V_{OFD}$ takes the voltage $V_{OFD1}$. Therefore, as shown in FIGS. 4DA and 4DB, all the potential barriers P2 of the photodiodes $PD_O$ and $PD_E$ are higher than the channel barrier P4.

Therefore, the signal charges $Q_E$ stored in the photodiodes $PD_E$ of the even field are hardly drained to the n-type semiconductor substrate 10 during the odd field read period $\tau_O$, because of thermal emission of charges higher than the potential barrier P2. As a result, the saturated charge amounts of the photodiodes $PD_O$ of the odd field and the photodiodes $PD_E$ of the even field can be made generally equal, and the problem associated with the conventional technologies can be solved.

Next, during the period $\tau_O$ after the odd field read period $\tau_O$ is terminated, high speed drainage of unnecessary charges in the vertical transfer paths $VCT_1$ to $VCT_J$ and horizontal transfer path HCT is performed. Thereafter, during the even field read period $\tau_E$, the signal charges $Q_E$ stored in the photodiodes $PD_E$ of the even field are read.

Figure 4E:
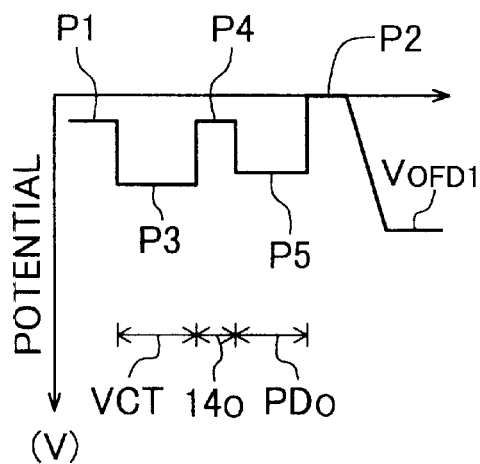
Figure 4E:
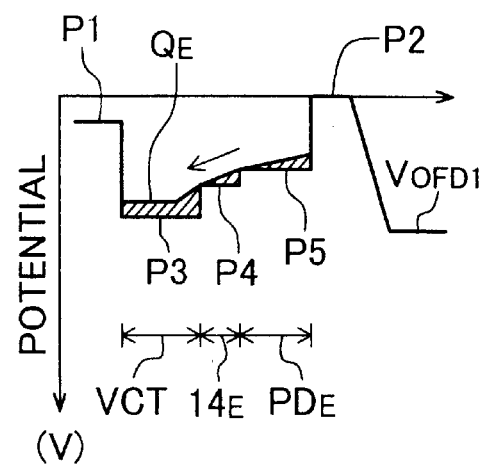

Specifically, in the even field read period $\tau_E$, a transfer pulse PL3 equal to or larger than the threshold voltage Vth is supplied as the drive signal V1 among the four-phase drive signals V1 to V4 during the vertical blanking period (refer to a timing t4). Therefore, as shown in FIG. 4EB, the channel barriers P4 of the interposed regions $14_E$ of the even field become lower than the potential P5 of the photodiodes $PD_E$, and the signal charges $Q_E$ stored in the photodiodes $PD_E$ of the even field are transferred to the vertical transfer paths VCT. As shown in FIG. 4EA, the channel barriers P4 of the interposed regions $14_O$ of the odd field remain high, and signal charges are not transferred from the photodiodes $PD_O$ to the vertical transfer paths VCT.

Figure 4F:
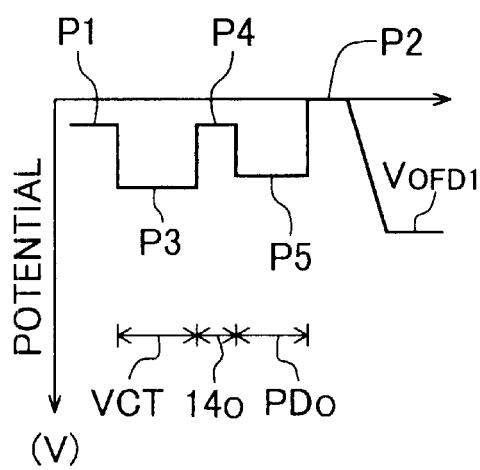
Figure 4F:
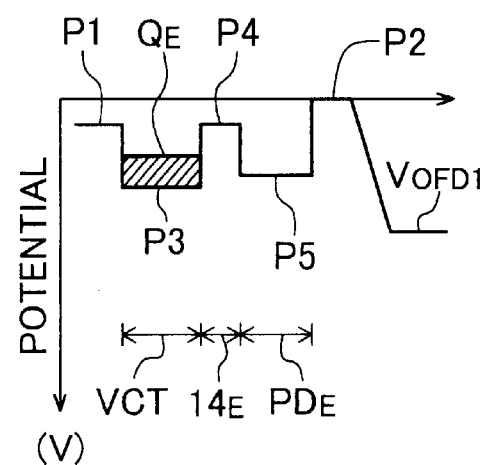

Thereafter, during a period until the even field read period $\tau_E$ is terminated, vertical transfer operations are performed by the vertical transfer paths $VCT_1$ to $VCT_J$ synchronously with the four-phase drive signals V1 to V4 and horizontal transfer operations are performed' by the horizontal transfer path HCT synchronously with the two-phase drive signals H1 and H2, to thereby output the pixel signal Vout of the even field under the potential profiles shown in FIGS. 4FA and 4FB.

After the completion of the odd and even field read operations, the photographing mode period $T_{EX}$ is terminated (refer to a timing t5), and at the same time, the mechanical shutter is opened to again resume the process during the monitor mode period Tmon during which the same operations described earlier are performed.

According to ILCCD 1 of this embodiment, during the odd field read period $\tau_O$ of the photographing mode period $T_{EX}$, all the potential barriers P2 of the photodiodes $PD_{1,1}$ to $PD_{I,J}$ are made higher than the channel barrier P4, as shown in FIGS. 4DA and 4DB. Therefore, the problem can be solved, i.e., the signal charges $Q_E$ stored in the photodiodes $PD_E$ of the even field will not be drained to the n-type semiconductor substrate 10 during the odd field read period $\tau_O$ because of thermal emission of charges higher than the potential barrier P2.

As a result, the saturated charge amounts of the photodiodes $PD_O$ of the odd field and the photodiodes $PD_E$ of the even field can be made generally equal. By reproducing the image signals Vout read during the field read periods, an object image of high quality and with less variation in luminance can be obtained.

(2nd Embodiment)

Figure 5:
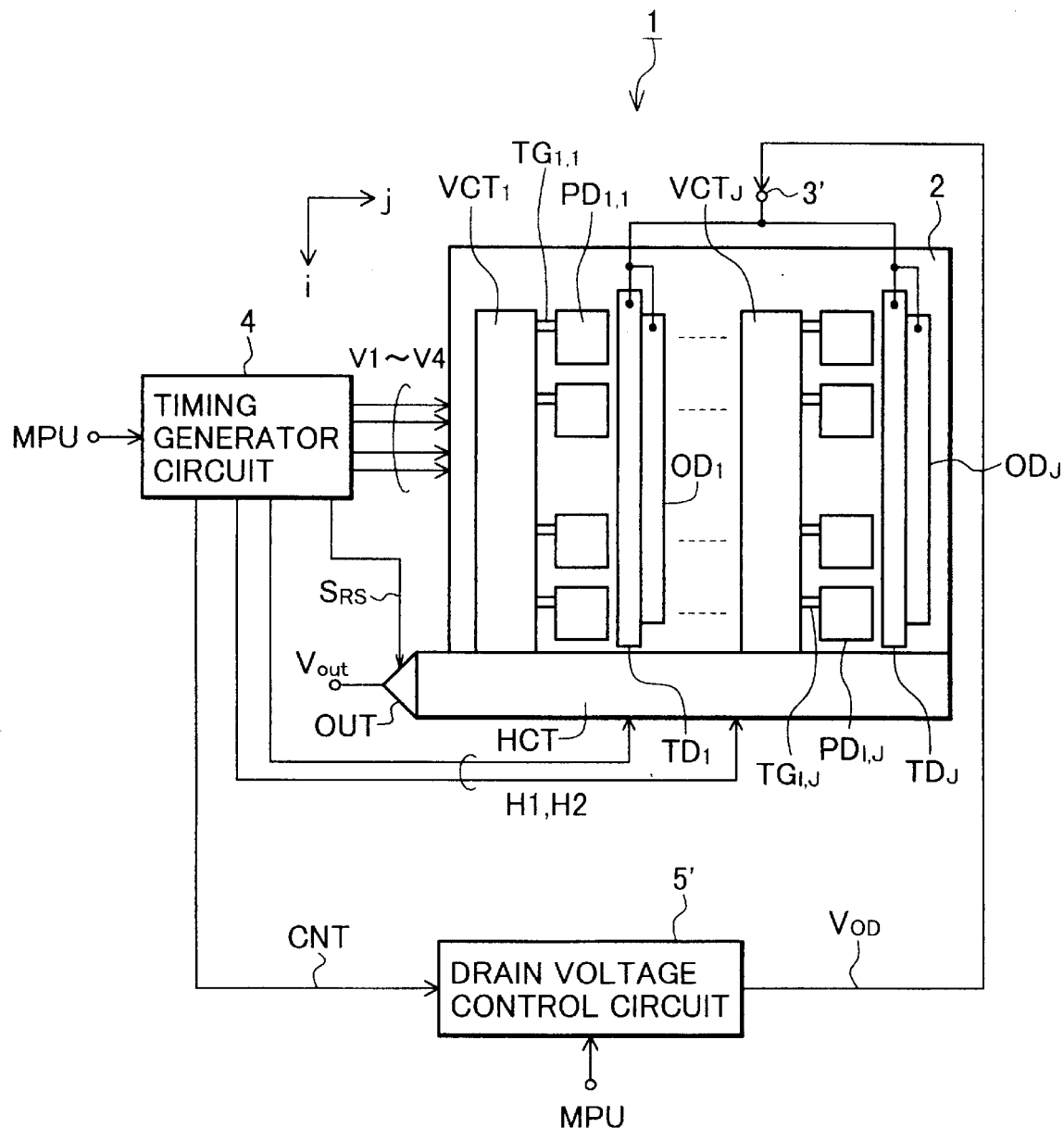
FIG. 5 is a plan view showing the structure of a solid state image pickup device according to a second embodiment of the invention.
Figure 6A:
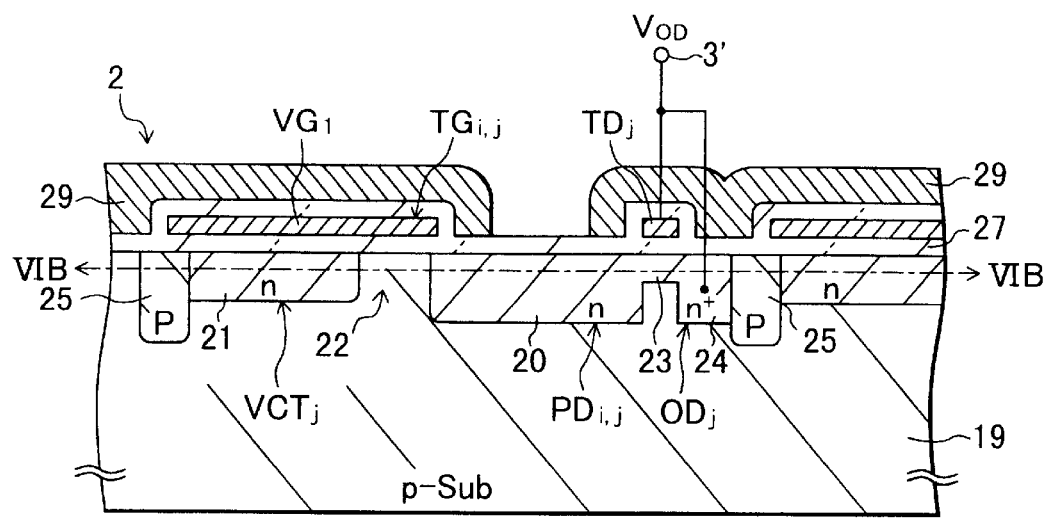
FIGS. 6A and 6B is a cross sectional view and a graph showing the structure and potential profile of the solid state image pickup device shown in FIG. 5.
Figure 6B:
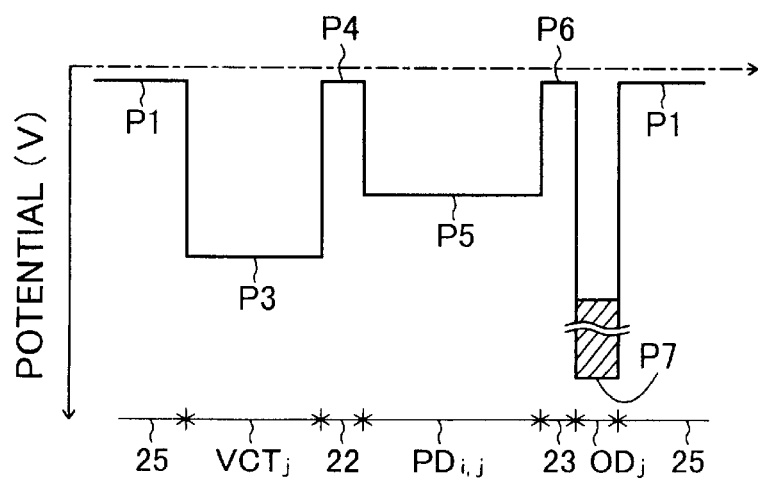
Figure 7A:
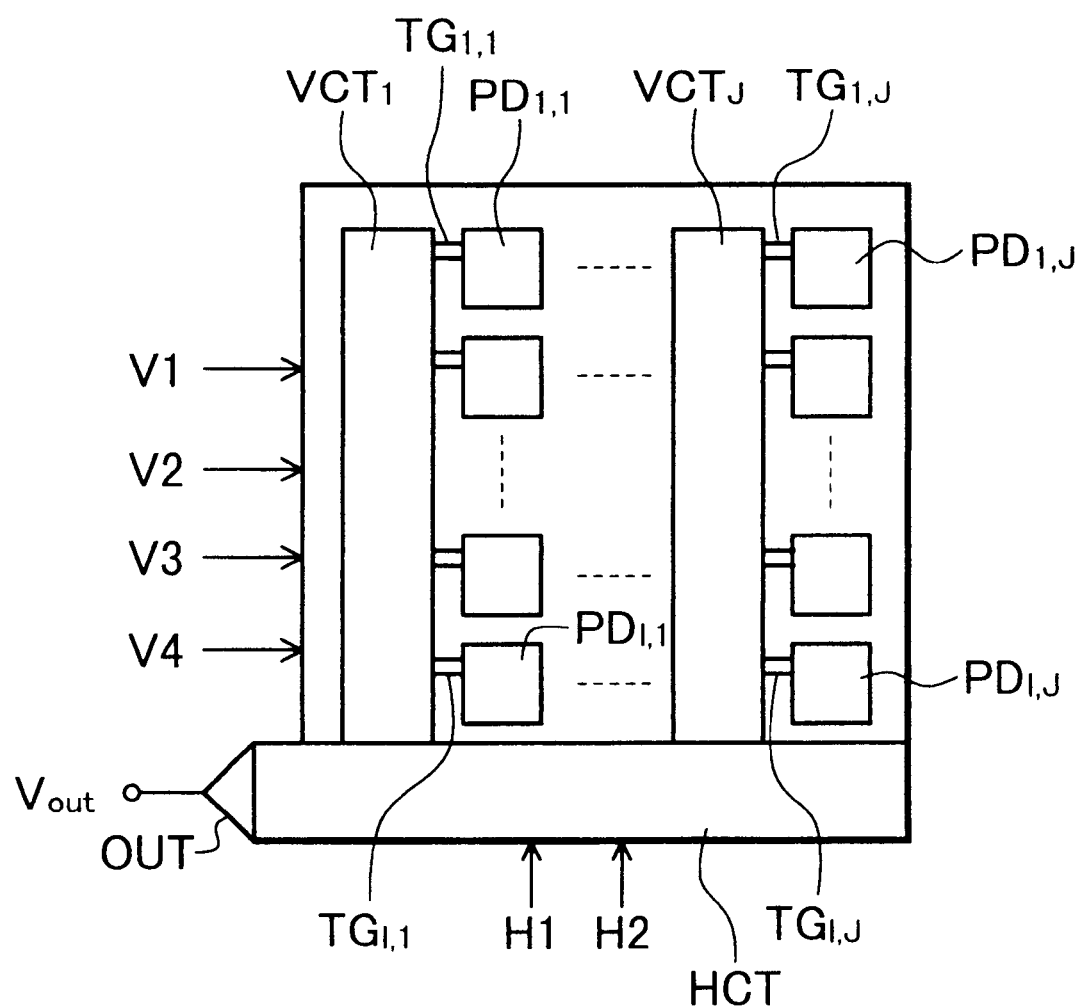
FIGS. 7A and 7B are a plan view and a timing chart illustrating the structure and operation of a conventional solid state image pickup device.
Figure 7B:
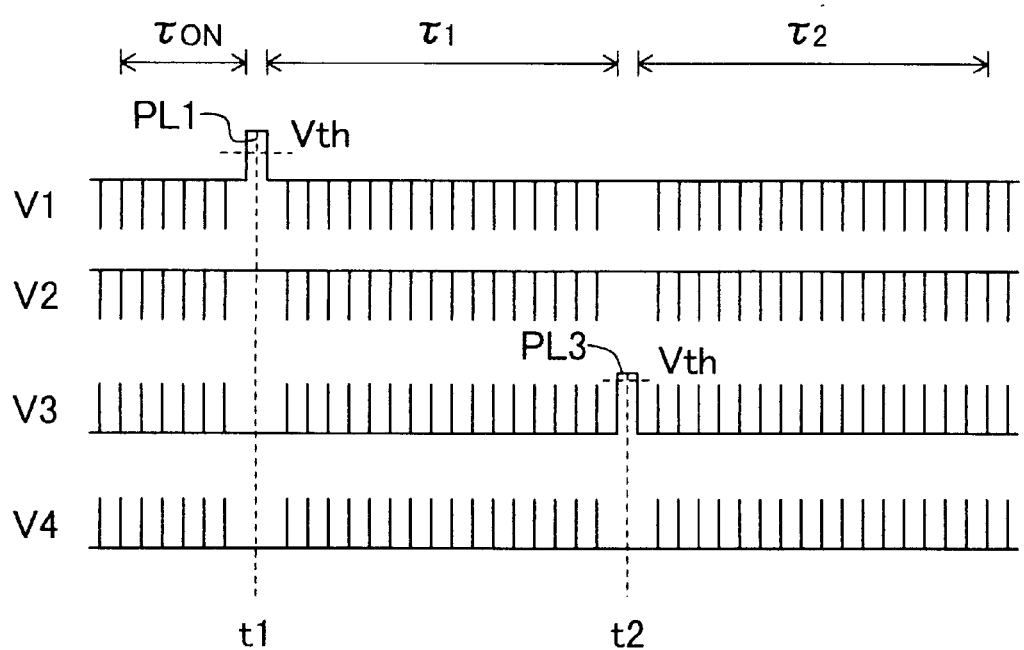

Next, with reference to FIGS. 5, 6A, and 6B, ILCCD of the second embodiment will be described. In FIGS. 5, 6A, and 6B, identical or corresponding elements to those shown in FIGS. 1, 2B, and 2C are represented by the same reference numerals and symbols.

In ILCCD of the first embodiment, as shown in FIG. 2B, the vertical direction overflow drain structure is provided in which the substrate voltage control signal $V_{OFD}$ is applied to the n-type semiconductor substrate 10 to control the level of the potential barrier P2 under the photodiodes $PD_{1,1}$ to $PD_{I,J}$ and drain unnecessary charges to the n-type semiconductor substrate 10. In this case, the n-type semiconductor substrate 10 is an overflow drain.

In ILCCD of the second embodiment, as shown in FIGS. 5 and 6A, a lateral direction overflow drain structure is provided in which a control voltage is not applied to a semiconductor substrate 19, but transfer gates $TD_1$ to $TD_J$ and overflow drains $OD_1$ to $OD_J$ extending in the vertical direction i are formed on the right side of the photodiodes $PD_{1,1}$ to $PD_{I,J}$ to drain unnecessary charges to the overflow drains $OD_1$ to $OD_J$. In this case, the terminal for applying a control voltage to the semiconductor substrate 19 is not provided.

A drain voltage control signal $V_{OD}$ is applied to a terminal 3' connected to the transfer gate $TD_1$ to $TD_J$ and to the overflow drain $OD_1$ to $OD_J$ to adjust the level of the potential barrier P6 (FIG. 6B) under the transfer gate $TD_1$ to $TD_J$. In this manner, unnecessary charges in the photodiodes $PD_{1,1}$ to $PD_{I,J}$ are drained to the overflow drains $OD_1$ to $OD_J$ or the saturated charge amounts in the photodiodes $PD_{1,1}$ to $PD_{I,J}$ are uniformalized. Furthermore, as shown in FIG. 5, ILCCD has a drain voltage control circuit 5' having a circuit configuration similar to the substrate voltage control circuit 5 shown in FIG. 1. The drain voltage control circuit 5' applies the drain voltage control signal $V_{OD}$ to the terminal 3', the signal having a waveform similar to the substrate voltage control signal $V_{OFD}$ output from the substrate voltage control circuit 5.

FIG. 6A is a cross sectional view of a representative cell structure of a photodiode $PD_{I,J}$, and adjacent vertical transfer path $VCT_J$, transfer gates $TG_{I,J}$ and $TD_J$, and overflow drain $OD_J$.

Referring to FIG. 6A, in a p-type semiconductor substrate 19, an n-type semiconductor region 20 constituting a portion of the photodiode $PD_{I,J}$ and an n-type semiconductor region 21 constituting the vertical transfer path $VCT_J$ are formed. Between these n-type semiconductor regions 20 and 21, an interposed region 22 forming a channel with the transfer gate $TG_{I,J}$ is formed. On the right side of the n-type semiconductor region 20, a thin n-type semiconductor region 23 forming a channel with the transfer $TD_J$ and an $n^+$-type semiconductor region 24 constituting the overflow drain $OD_J$ are formed. On the outer sides of the n-type semiconductor region 21 and $n^+$-type semiconductor region 24, a channel stopper 25 made of a p-type semiconductor region is formed.

Over the n-type semiconductor region 21 and interposed region 22, a transfer electrode (of the vertical transfer path $VCT_1$ to $VCT_J$) and transfer gate $TG_{I,j}$ to which the drive signal V1 is applied are formed with an interlayer insulating film 27 being interposed therebetween. Over the n-type semiconductor region 23, the transfer gate $TD_J$ to which a control voltage $V_{OD}$ is applied is formed with the interlayer insulating film 27 being interposed therebetween. The surface of the light reception area 2 excepting a predetermined region of the n-type semiconductor region 20 is covered with a light shielding film (aluminum film) 29. The transfer gate $TD_J$ and $n^+$-type semiconductor region 24 are electrically connected to the terminal 3' to which the control voltage $V_{OD}$ is applied.

The other cells have the same cell structure as the above-described cell structure including the photodiode $PD_{I,J}$ adjacent vertical transfer path $VCT_J$, transfer gates $TG_J$ and $TD_J$, and overflow drain $OD_J$.

FIG. 6B is a graph showing a potential profile in the substrate horizontal direction along one-dot chain line VIB—VIB of FIG. 6A.

Referring to FIG. 6B, the channel stopper 25 of p-type semiconductor forms a potential barrier P1 having a highest fixed level. Formed between the two potential barriers P1 and P1 are a potential well P3 of the vertical transfer path $VCT_J$, a channel barrier P4 of the interposed region 22 under the transfer gate $TG_{I,J}$, a potential P5 of the photodiode $PD_{I,J}$, a potential barrier P6 of the interposed region 23 under the transfer gate $TD_J$, and a potential P7 of the overflow drain $OD_J$. When a negative drain voltage $V_{OD}$ is applied, the potential P4 can be made generally equal to or higher than the channel barrier P4.

ILCCD 1 having the structure described above also processes the monitor mode and photographing mode in accordance with signals having timings similar to those shown in FIG. 3. In the second embodiment, in place of the substrate voltage control signal $V_{OFD}$ shown in FIG. 3, the drain voltage control signal $V_{OD}$ is used.

When ILCCD 1 operates in accordance with the timings shown in FIG. 3, the drain voltage control signal $V_{OD}$ of a high voltage $V_{OFD2}$ is applied to the transfer gates $TD_1$ to $TD_J$ during the exposure period $\tau_{PD}$ of the monitor mode period Tmon. Therefore, the potential barrier P6 shown in FIG. 6B becomes slightly lower than the channel barrier P4.

Therefore, even if excessive charges are generated upon incidence of high illuminance light upon the photodiodes $PD_{1,1}$ to $PD_{I,J}$ during the exposure period $\tau_{PD}$, the excessive charges are drained to the overflow drains $OD_1$ to $OD_J$ via the potential barrier P6 lower than the channel barrier P4 and do not leak to the vertical transfer path $VCT_1$ to $VCT_J$. Accordingly, a pixel signal Vout containing almost no noise component can be output. By reproducing the pixel signal Vout and displaying the image on a liquid crystal monitor or the like of the electronic still camera, an object image of high quality can be observed.

Also during the odd field read period no of the photographing mode $T_{EX}$, the drain voltage control signal $V_{OD}$ of a low voltage $V_{OFD1}$ is applied and the potential barrier P6 shown in FIG. 6B becomes higher than the channel barrier P4. Therefore, the problem can be solved, i.e., the signal charges stored in the photodiodes of the even field will not be drained to the overflow drains $OD_1$ to $OD_J$ during the odd field read period because of thermal emission of charges higher than the potential barrier P6. As a result, the saturated charge amounts of the photodiodes of the odd field and the photodiodes of the even field can be made generally equal.

In the embodiments described above, during the photographing mode, the even field is read after the odd field was read. The invention is not limited only thereto, but the odd field may be read after the even field was read.

In summary, the advantageous effects of the embodiment can be obtained by setting the potential barrier between the light reception element (photodiode) and overflow drain (substrate) higher than the channel barrier under the transfer gate $TG_{I,J}$ during the first field read which is performed before the second field read.

(3rd Embodiment)

A solid state image pickup device of the third embodiment is constituted of an ILCCD and its control circuit. The solid image pickup device is used with an electronic still camera. ILCCD is mounted behind a light transmission/interception means (shutter means) of the electronic still camera, to perform an image pickup operation.

Figure 9A:
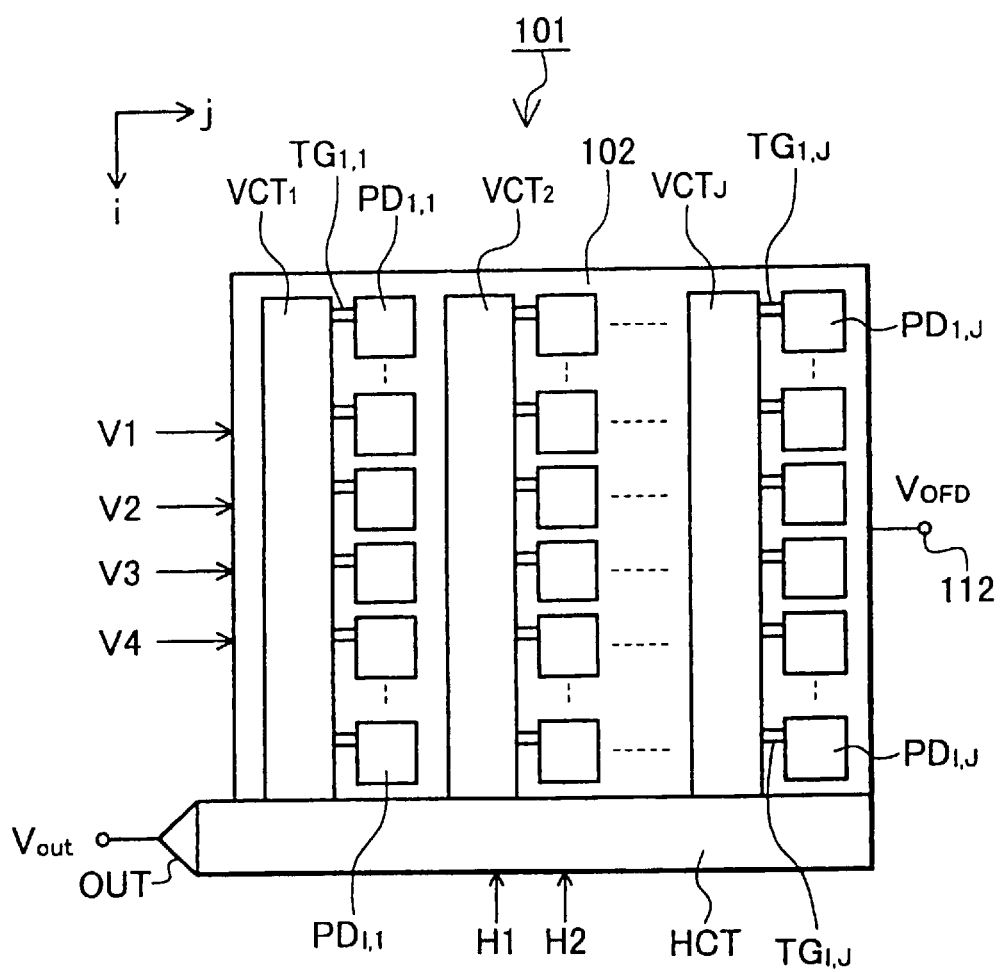
FIGS. 9A and 9B are plan views showing the structure of a solid state image pickup device according to a third embodiment of the invention.
Figure 9B:
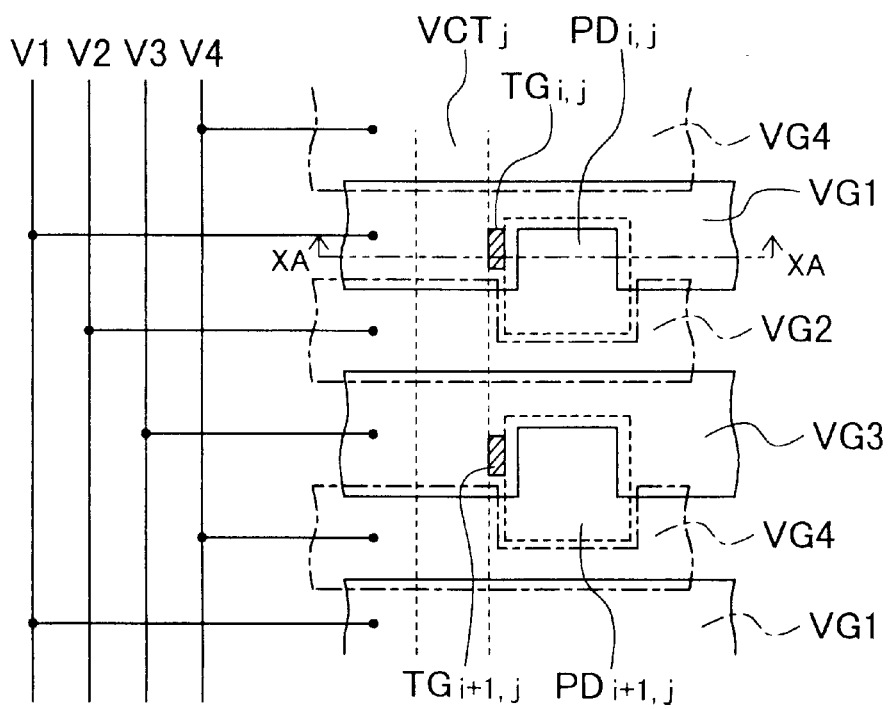
Figure 10A:
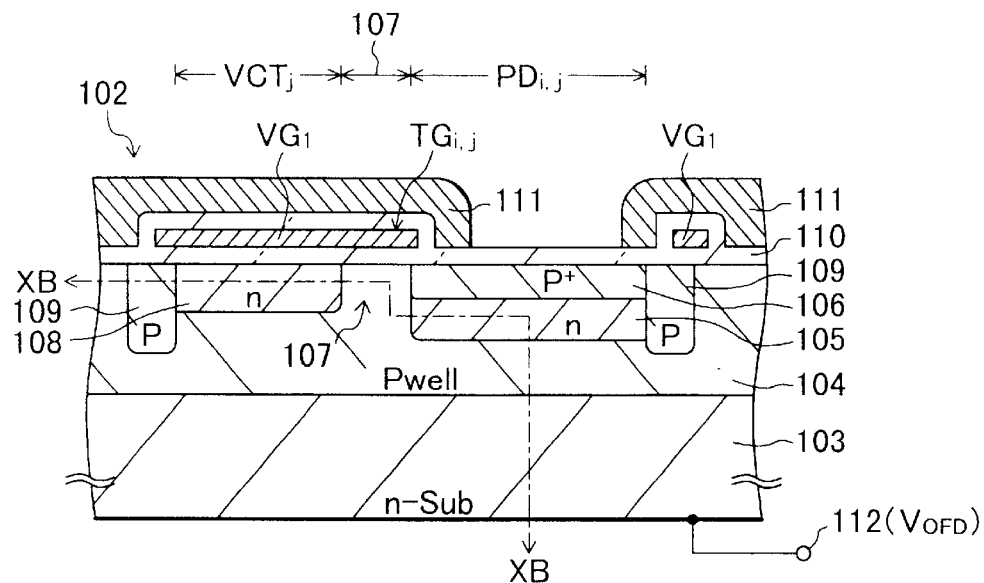
FIGS. 10A and 10B are a cross sectional view and a graph showing the structure and potential profile of the solid state image pickup device shown in FIG. 9A.
Figure 10B:
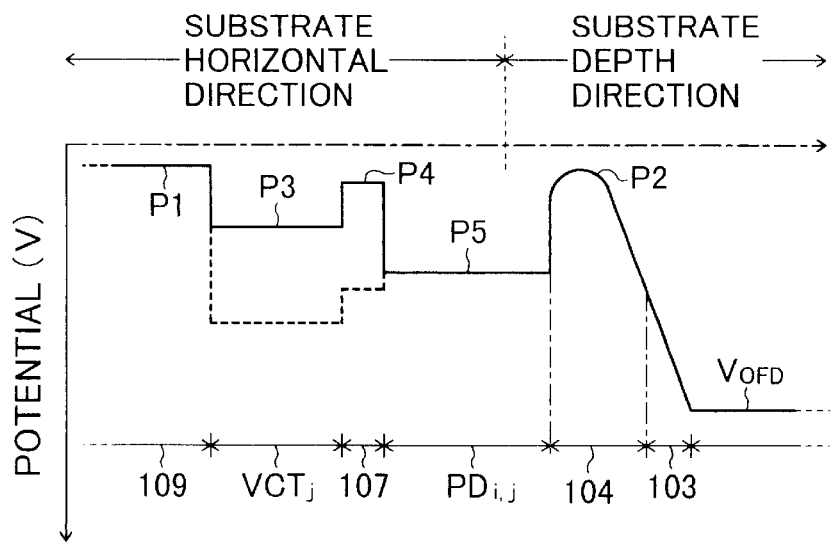

FIGS. 9A and 9B are plan views showing the brief structure of the solid state image pickup device with ILCCD according to the third embodiment, and FIGS. 10A and 10B are a cross sectional view showing the outline structure of a light reception element and a vertical transfer path, and a graph showing a potential profile.

Referring to the plan view shown in FIG. 9A, ILCCD 101 is integrally formed on a single semiconductor substrate by semiconductor integrated circuit manufacture technologies. Formed in a light reception area 102 of ILCCD 101 are: I×J p-n junction type photodiodes $PD_{1,1}$ to $PD_{I,J}$ disposed in a two-dimensional matrix form along a vertical direction i and a horizontal direction j; J vertical transfer paths $VCT_1$ to $VCT_J$ juxtaposed with the photodiodes $PD_{1,1}$ to $PD_{I,J}$ at the left side thereof via transfer gates $TG_{1,1}$ to $TG_{I,J}$; a horizontal transfer path HCT connected to lower ends of the vertical transfer paths $VCT_1$ to $VCT_J$; and an output circuit OUT connected to the left end of the horizontal transfer path HCT. As shown in FIGS. 9A and 10A, a terminal 112 for applying a substrate voltage control signal $V_{OFD}$ is connected to the bottom surface of ILCCD 101. Of the light reception area 102, the area excepting the light incidence surface (light reception surface) is covered with a light shielding film (aluminum film) to suppress formation of unnecessary charges. When a voltage is applied to the transfer gate $TG_{1,1}$ to $TG_{I,J}$, a channel can be formed in a channel region 107 (FIG. 10A).

Of the photodiodes $PD_{1,1}$ to $PD_{I,J}$ and transfer gates $TG_{1,1}$ to $TG_{I,J}$, those on odd rows constitute an odd field and those on even rows constitute an even field. Signal charges of one frame stored in the photodiodes $PD_{1,1}$ to $PD_{I,J}$ are read by two steps, odd field read and even field read.

More specifically, during the odd field read period, signal charges photo-excited and stored in the photodiodes of the odd field are transferred to the vertical transfer paths $VCT_1$ to $VCT_J$ which vertically transfer the signal charges in the vertical direction i synchronously with the four-phase drive signal V1 to V4. The signal charges vertically transferred for each line are transferred to the horizontal transfer path HCT which horizontally transfers the signal charges in the horizontal direction j synchronously with the two-phase drive signals H1 and H2. These vertical and horizontal transfer operations are repeated to read the pixel signal Vout of the odd field from the output circuit OUT.

During the even field read period, the vertical transfer paths $VCT_1$ to $VCT_J$ transfer, in the vertical direction, signal charges photo-excited and stored in the photodiodes of the even field synchronously with the four-phase drive signal V1 to V4. The signal charges vertically transferred for each line are transferred in the horizontal direction by the horizontal transfer path HCT synchronously with the two-phase drive signals H1 and H2. These vertical and horizontal transfer operations are repeated to read the pixel signal Vout of the even field from the output circuit OUT.

FIG. 9B is a plan view of a representative layout of a photodiode $PD_{I,J}$ of the odd field, a photodiode $PD_{I+1,J}$ of the even field, and a vertical transfer path $VCT_J$ adjacent to the photodiode.

Referring to FIG. 2A, a set of four transfer electrodes VG1 to VG4 of an overlapping gate structure is disposed repetitively in the vertical direction i over the vertical transfer path $VCT_J$. The four-phase drive signals V1 to V4 from a timing generator circuit 113 to be described later are applied to the corresponding transfer electrodes VG1 to VG4. As the four-phase drive signals V1 to V4 change at predetermined timings in a predetermined voltage range, potential wells are formed in the vertical transfer path $VCT_J$ in accordance with the voltage change of the four-phase drive signals V1 to V4. In accordance with a change in the potential wells, signal charges are separated in the unit of pixel and transferred in the vertical direction i.

The transfer gate $TG_{I,J}$ shown hatched and formed between the photodiode $PD_{I,J}$ and vertical transfer path $VCT_J$ is a portion of the first transfer electrode VG1. As a transfer pulse having a level higher than a predetermined threshold voltage Vth is applied as the drive signal V1 to the transfer electrode VG1, the potential barrier (channel barrier) under the transfer gate $TG_{I,J}$ lowers so that the channel between the photodiode $PD_{I,J}$ and vertical transfer path $VCT_J$ becomes conductive.

The transfer gate $TG_{I+1,J}$ shown hatched and formed between the photodiode $PDTG_{I+1,J}$ and vertical transfer path $VCT_J$ is a portion of the first transfer electrode VG3. As a transfer pulse having a level higher than the predetermined threshold voltage Vth is applied as the drive signal V3 to the transfer electrode VG3, the channel barrier under the transfer gate $TGTG_{I+1,J}$ lowers so that the channel between the photodiode $PDTG_{I+1,J}$ and vertical transfer path $VCT_J$ becomes conductive.

FIG. 10A is a cross sectional view taken along one-dot chain line XA—XA of FIG. 9B and showing the structure of the vertical transfer path $VCT_J$, transfer gate $TG_{I,J}$, photodiode $PD_{I,J}$, and their peripheral elements.

Referring to FIG. 10A, an n-type semiconductor region 105 and a $p^+$-type semiconductor region 106 constituting the photodiode $PD_{I,J}$ are formed in a p-type well 104 formed on an n-type semiconductor substrate 103. The p-type well 104, n-type semiconductor region 105, and $p^+$-type semiconductor region 106 constitute the photodiode $PD_{I,J}$. To the left of these semiconductor regions 105 and 106, an n-type semiconductor region 108 constituting the vertical transfer path $VCT_J$ is formed, with an interposed region 107 constituting a portion of the p-type well region 104 being formed.

A channel stopper 109 is formed in the p-type well 104, the channel stopper being made of a p-type semiconductor region which surrounds the semiconductor regions 105, 106, and 108 and the interposed region 107. This channel stopper 16 electrically separates adjacent columns to thereby prevent lateral leak of signal charges in the photodiode $PD_{I,J}$, vertical transfer path $VCT_J$, and transfer gate $TG_{I,J}$.

The transfer electrode VG1 made of polysilicon is formed over the n-type semiconductor region 108 and interposed region 107, with an interlayer insulating film (silicon oxide film) 110 being interposed therebetween. The right end portion of the transfer gate VG1 forms the transfer gate $TG_{I,J}$. An area of the light reception area 2 excepting a predetermined area of the $p^+$-type semiconductor region 106 is covered with a light shielding film (aluminum film) 111. A metal deposition film is formed on the bottom surface of the n-type semiconductor substrate 103 and the terminal 112 is connected to the metal deposition film.

FIG. 10B is a graph showing a potential profile along one-dot chain line XB—XB of FIG. 10A. This potential profile relative to electrons shows potentials along the substrate horizontal direction in the vertical transfer path $VCT_J$, in the interposed region 107, and in a partial area of the photodiode $PD_{I,J}$, and along the substrate depth direction from the photodiode $PD_{I,J}$ to the n-type semiconductor substrate 103.

Referring to FIG. 10B, the channel stopper 109 in the p-type semiconductor region forms a potential barrier P1 having a high fixed level, and the p-type well 104 forms a potential barrier P2. Formed between these potential barriers P1 and P2 are a potential well P3 of the vertical transfer path $VCT_J$, a channel barrier P4 of the interposed region 107 under the transfer gate $TG_{I,J}$, and a potential well P5 of the photodiode $PD_{I,J}$.

If the drive signal V1 is equal to a predetermined threshold voltage Vth or lower, the channel barrier P4 under the transfer gate $TG_{I,J}$ rises as indicated by a solid line in FIG. 10B. If the drive signal V1 is a transfer pulse higher than the threshold voltage Vth, the channel barrier P4 under the transfer gate $TG_{I,J}$ becomes lower than the potential well P5 of the photodiode as indicated by a broken line shown in FIG. 10B. Therefore, signal charges in the photodiode $PD_{I,J}$ pass over the low channel barrier P4 and are transferred to the vertical transfer path $VCT_J$.

The level of the potential barrier P2 becomes lower as the voltage of the substrate voltage control signal $V_{OFD}$ becomes higher (potential becomes lower), and vice versa.

While the drive signal V1 changes in a predetermined voltage range equal to or lower than the threshold voltage Vth, signal charges are transferred in the vertical transfer path $VCT_J$.

All the photodiodes $PD_{1,1}$ to $PD_{I,J}$, transfer gates $TG_{1,1}$ to $TG_{I,J}$, and vertical transfer paths $VCT_1$ to $VCT_J$ have a potential profile similar to the above.

In this embodiment, the drive signals V1 to V4 and the voltage of the substrate voltage control signal $V_{OFD}$ are controlled to adjust the level of each channel barrier under the transfer gate $TG_{1,1}$ to $TG_{I,J}$. Through this adjustment, the following operations are performed. Namely, unnecessary charges left in the photodiodes $PD_{1,1}$ to $PD_{I,J}$ are drained to the n-type semiconductor substrate 103, charges are generated and stored in the photodiodes $PD_{1,1}$ to $PD_{I,J}$, signal charges stored in the photodiodes $PD_{1,1}$ to $PD_{I,J}$ are transferred to the vertical transfer paths $VCT_1$ to $VCT_J$, and the signal charges in the vertical transfer paths are vertically transferred to the horizontal transfer path HCT.

Next, with reference to FIG. 11A, the structures of a circuit for making ILCCD 101 execute the vertical and horizontal charge transfer operations and a substrate voltage control circuit for generating the substrate voltage control signal $V_{OFD}$ will be described.

Figure 11A:
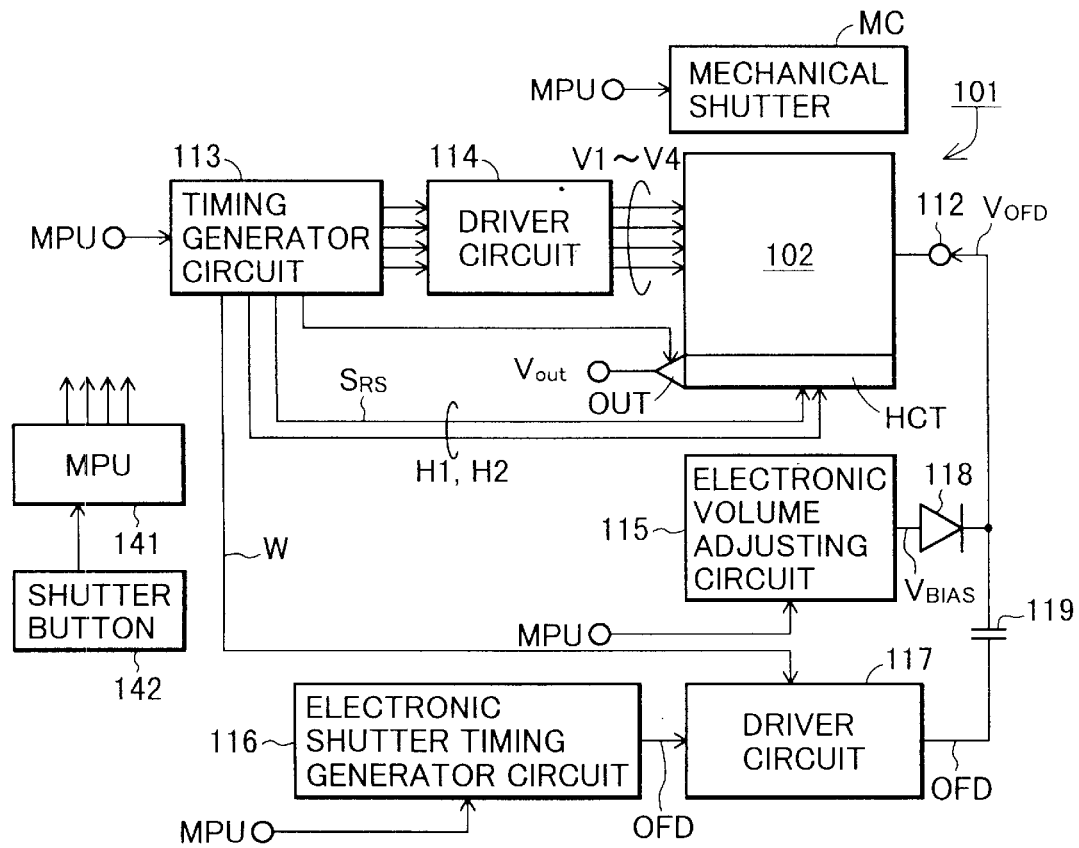
FIGS. 11A and 11B are a block diagram and a graph illustrating the structure and operation of a substrate voltage control circuit.

Referring to FIG. 11A, the circuit for the vertical and horizontal charge transfer operations is constituted of a timing generator circuit 113 and a driver circuit 114. The substrate voltage control circuit is constituted of an electronic volume adjusting circuit 115, an electronic shutter timing generator circuit 116, a driver circuit 117, a rectifying diode 118, and a coupling capacitor 119.

The timing generator circuit 113 generates: four-phase drive signals V1 to V4 for driving the vertical transfer paths $VCT_1$ to $VCT_J$; two-phase drive signals H1 and H2 for driving the horizontal transfer path HCT; and a timing control signal $S_{RS}$ for controlling a set/reset operation of the output circuit OUT. The driver circuit 114 supplies power-amplified four-phase drive signals V1 to V4 to the transfer electrodes VG1 to VG4 of the vertical transfer paths $VCT_1$ to $VCT_J$.

Figure 11B:
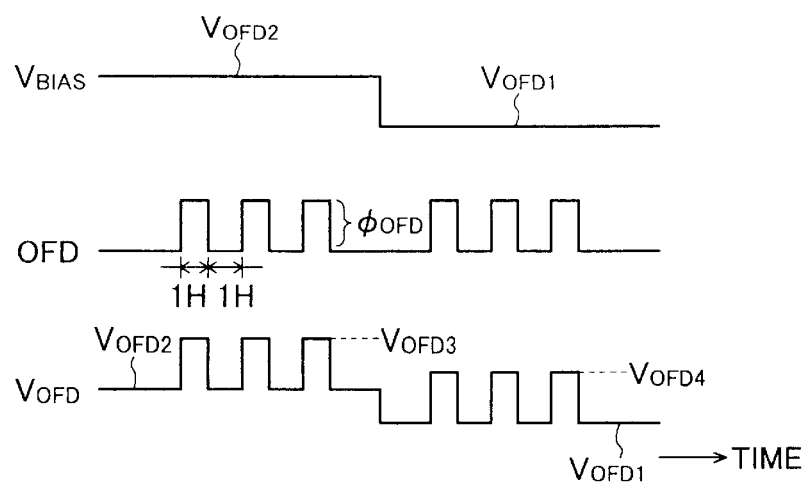

In response to an instruction from a microprocessor (MPU) 141 of the electronic still camera, the electronic volume adjusting circuit 115 outputs a reference voltage signal $V_{BIAS}$ of a d.c. voltage $V_{OFD1}$ or $V_{OFD2}$ such as shown in FIG. 11B.

Synchronously with an instruction from the microprocessor 141, the electronic shutter timing generator circuit 116 outputs an electronic shutter signal OFD having a set of three rectangular pulses such as shown in FIG. 11B. This rectangular signal changes between high and low levels synchronously with the one horizontal scan period (1H period). An amplitude of the high level is set to $\phi_{OFD}$.

The microprocessor 141 controls a mechanical shutter MC in accordance with an operation state of a shutter button 142. In response to an instruction from the microprocessor 141, the mechanical shutter MC is mechanically opened or closed. When the mechanical shutter MC is opened, incidence light to photodiodes passes therethrough, and when it is closed, it is intercepted. The timing generator circuit 113 outputs an open/close timing signal W for opening/closing the mechanical shutter MC.

Synchronously with the open/close timing signal W supplied from the timing generator circuit 113, the driver circuit 117 disables or enables the electronic shutter signal OFD. Namely, while the mechanical shutter MC of the electronic still camera is open, the open/close timing signal W takes a logical level "L" (low level), whereas while the mechanical shutter MC of the electronic still camera is close, the open/close timing signal W takes a logical level "H" (high level). When the open/close timing signal W of "L" is supplied to the drive circuit 117, the rectangular signal of the electronic shutter signal OFD is enabled, whereas when the open/close timing signal W of "H" is supplied, the rectangular signal of the electronic shutter signal OFD is disabled. With such operations, the drive circuit 117 outputs the electronic shutter signal OFD containing the rectangular signal only when the mechanical shutter MC is open.

An output of the electronic volume adjusting circuit 115 is coupled to the anode of the diode 118, and an output of the driver circuit 117 is coupled to one terminal of the capacitor 119. The cathode of the diode 118 and the other terminal of the capacitor 119 are connected together to the terminal 112.

The reference voltage signal $V_{BIAS}$ output from the electronic volume adjusting circuit 115 and the electronic shutter signal OFD output from the driver circuit 117 are added together by the rectifying diode 118 and capacitor 119 to generate the substrate voltage control signal $V_{OFD}$ such as shown in FIG. 11B which is supplied to the terminal 112.

A relation between the d.c. voltages $V_{OFD1}$ and $V_{OFD2}$ is set as $V_{OFD1} < V_{OFD2}$. The amplitude $\phi_{OFD}$ of the rectangular signal of the electronic shutter signal OFD is set as $\phi_{OFD} > V_{OFD2} - V_{OFD1}$. Therefore, when the reference voltage $V_{BIAS}$ is switched to the d.c. voltage $V_{OFD2}$, the bias voltage level of the substrate voltage control signal $V_{OFD}$ becomes $V_{OFD2}$, and the largest amplitude $V_{OFD3}$ of the signal $V_{OFD}$ with the electronic shutter signal OFD superposed upon the signal $V_{BIAS}$ becomes $V_{OFD2} + \phi_{OFD}$. When the reference voltage $V_{BIAS}$ is switched to the d.c. voltage $V_{OFD1}$, the bias voltage level of the substrate voltage control signal $V_{OFD}$ becomes $V_{OFD1}$, and the largest amplitude $V_{OFD4}$ of the signal $V_{OFD}$ with the electronic shutter signal OFD superposed upon the signal $V_{BIAS}$ becomes $V_{OFD1} + \phi_{OFD}$ (where $V_{OFD2} < V_{OFD1} + \phi_{OFD} < V_{OFD3}$.

Next, with reference to the timing chart of FIG. 12, the operation of the electronic still camera with ILCCD 101 will be described.

The electronic still camera has a monitor (moving image) mode in which an object is observed in real time on a display without actually photographing it and a photographing mode in which an object image is recorded as a still image.

Figure 12:
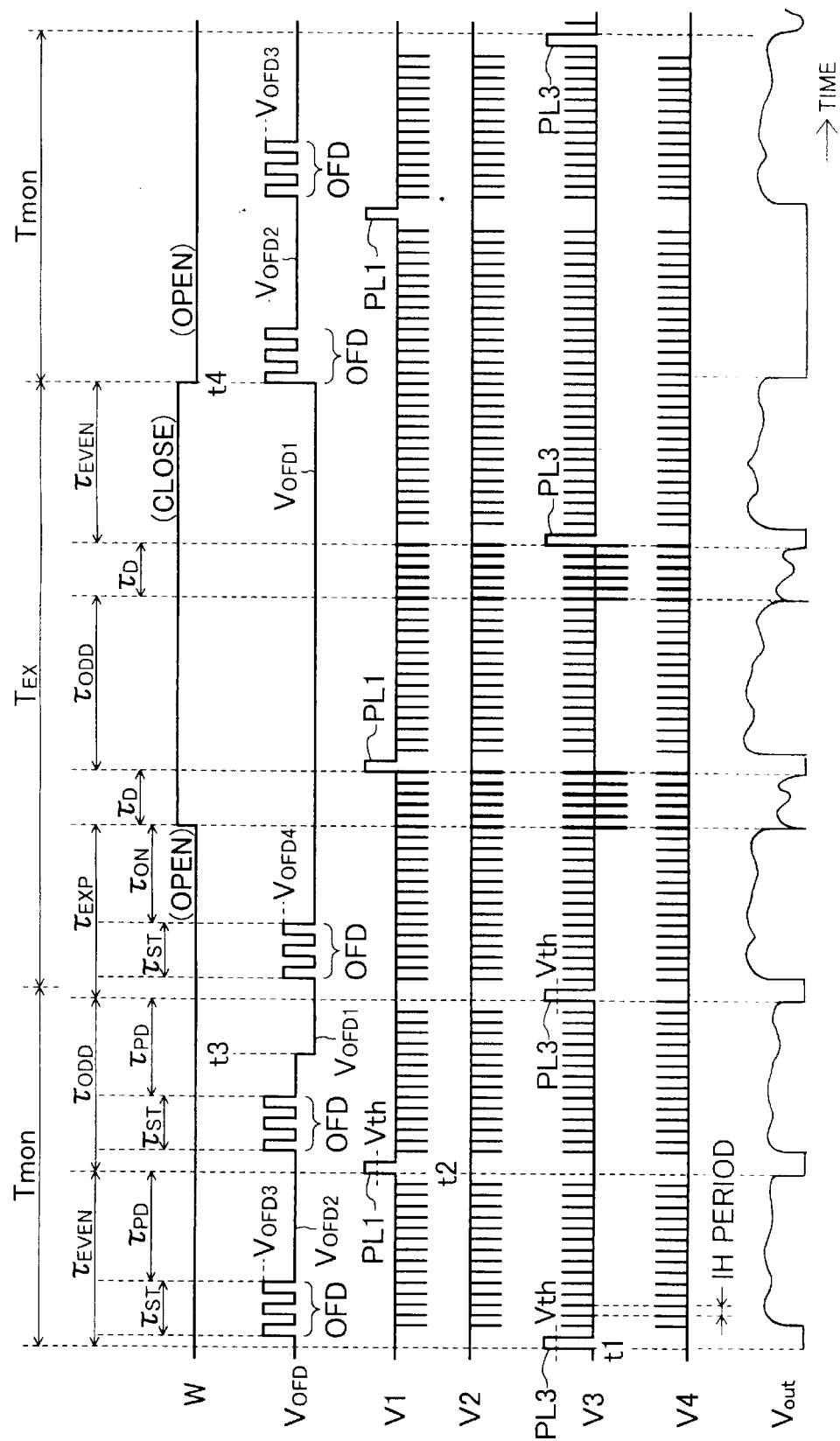
FIG. 12 is a timing chart illustrating the operation of the solid state image pickup device of the third embodiment applied to an electronic still camera.

Referring to FIG. 12, during the monitor mode period Tmon, an image field is monitored by repeating the even field read and the odd field read while the mechanical shutter is opened. While the mechanical shutter MC is open, the open/close timing signal W is "L", and until a shutter button switch 142 of the electronic still camera is depressed, the reference voltage signal $V_{BIAS}$ of the electronic volume adjusting circuit 115 takes the voltage $V_{OFD2}$.

In the even field read period $\tau t_{EVEN}$ of the monitor mode period Tmon, a transfer pulse PL3 equal to or larger than the threshold voltage Vth is first supplied as the drive signal V3 among the four-phase drive signals V1 to V4 during the vertical blanking period. Thereafter, until the even field read period $\tau_{EVEN}$ is terminated, the four-phase drive signals V1 to V4 change in a predetermined voltage range equal to or lower than the threshold voltage Vth to perform vertical transfer operations by the vertical transfer paths $VCT_1$ to $VCT_J$, and the vertically transferred signal charges are horizontally transferred by the horizontal transfer path HCT, to thereby output the pixel signal Vout.

During the period $\tau_{ST}$ after the timing t1, the electronic shutter timing generator circuit 116 outputs the electronic shutter signal OFD as the signal $V_{OFD}$. Therefore, the substrate voltage control signal $V_{OFD}$ is the electronic shutter signal OFD superposed upon the voltage $V_{OFD2}$.

Figure 13A:
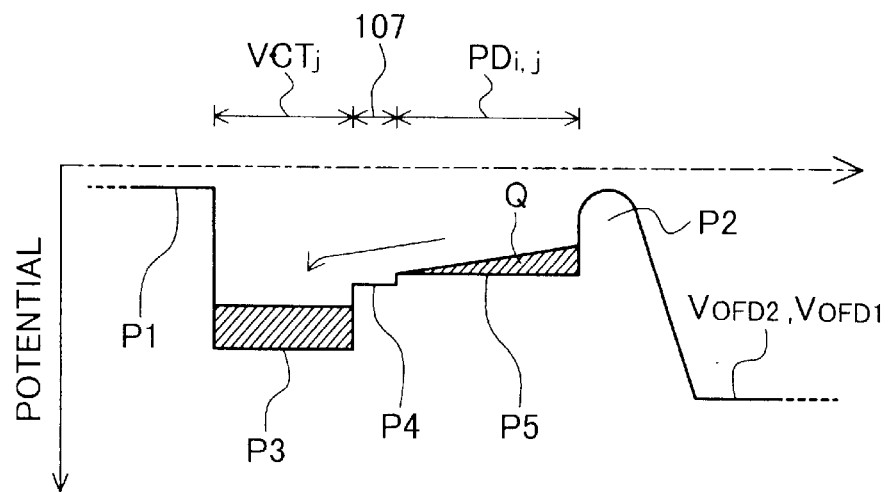
FIGS. 13A to 13E are graphs showing potential profiles illustrating the operation of the solid state image pickup device of the third embodiment.

In reading signal charges during the even field read period $\tau_{EVEN}$, as shown in FIG. 13A, at the timing t1 the transfer pulse PL3 higher than the threshold voltage Vth lowers the channel barrier P4 of the interposed region 107 of the even field. Therefore, the signal charges Q shown hatched and stored in the photodiode $PD_{I,J}$ of the even field are transferred to the vertical transfer path $VCT_J$.

Next, after this signal charge transfer, the vertical transfer paths $VCT_J$ start vertical transfer synchronously with the four-phase drive signals V1 to V4 equal to or lower than the threshold voltage Vth. During this vertical transfer, the channel barriers P4 under all the transfer gates $TG_{1,1}$ to $TG_{I,J}$ become high so that the channels between the photodiodes $PD_{1,1}$ to $PD_{I,J}$ and vertical transfer paths $VCT_1$ to $VCT_J$ become perfectly non-conductive.

Figure 13B:
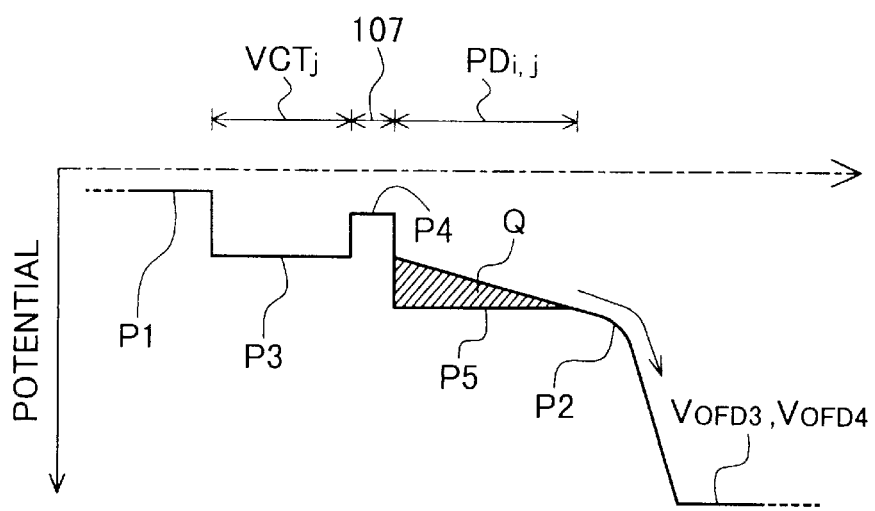

Next, during the period $\tau_{ST}$, the electronic shutter signal OFD of the substrate voltage control signal $V_{OFD}$ is applied to the n-type semiconductor substrate 103. Therefore, as shown in FIG. 13B, because of this voltage $V_{OFD3}$, all the potential barriers P2 corresponding to the photodiodes $PD_{1,1}$ to $PD_{I,J}$ become low so that the unnecessary charges Q shown hatched and left in the photodiodes $PD_{1,1}$ to $PD_{I,J}$ are drained to the n-type semiconductor substrate 103.

Figure 13C:
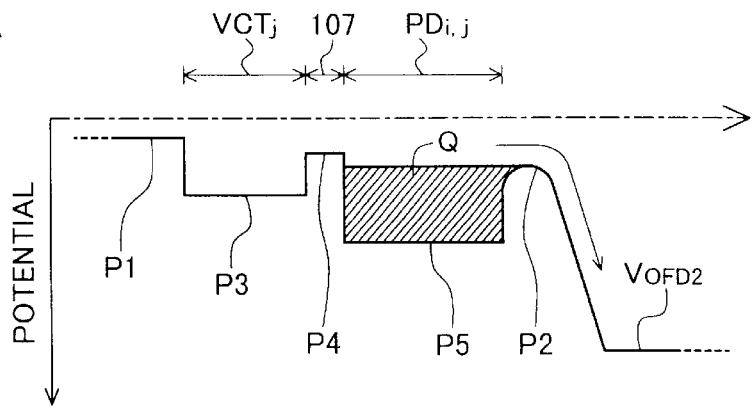

Next, after the period $\tau_{ST}$, the substrate voltage control signal $V_{OFD}$ takes again the voltage $V_{OFD2}$ so that the potential barrier P2 takes a level corresponding to the voltage $V_{OFD2}$ as shown in FIG. 13C, so that the charges Q shown hatched are stored in the photodiodes $PD_{1,1}$ to $PD_{I,J}$. The level of the potential barrier P2 is slightly lower than the channel barrier P4 under the interposed region 107. During the period $\tau_{PD}$ until the even field read period $\tau_{EVEN}$ is terminated, the potential profile shown in FIG. 13C is maintained. If there are excessive charges in the photodiodes $PD_{1,1}$ to $PD_{I,J}$, the excessive charges pass over the potential barrier P2 and are drained to the n-type semiconductor substrate 103 which functions as the overflow drain.

As above, during the even field read period τEVEN, the signal charges of the even field among those photo-excited and stored in the photodiodes $PD_{1,1}$ to $PD_{I,J}$, are transferred to the vertical transfer paths $VCT_1$ to $VCT_J$ at the timing t1 to start the even field read. During the period $\tau_{PD}$ after the unnecessary charges are drained by applying the electronic shutter signal OFD to the n-type semiconductor substrate 103, charges are generated and accumulated.

During the exposure period $\tau_{PD}$, as shown in FIG. 13C, the potential barrier P2 is lower than the channel barrier P4. Therefore, even if excessive charges are generated in the photodiodes $PD_{1,1}$ to $PD_{I,J}$ upon incidence of strong (excessive) light, the excessive charges pass over the potential barrier P2 and are drained to the n-type semiconductor substrate 103. The excessive charges are not leaked to the vertical transfer paths $VCT_1$ to $VCT_J$ so that the sensor blooming phenomenon can be avoided.

Also during the odd field read period $\tau_{ODD}$ of the monitor mode period Tmon, similar operations during the even field read period $\tau_{EVEN}$ are performed. Specifically, a transfer pulse PL1 supplied as the drive signal V1 at a start timing t2 of the odd field read period $\tau_{ODD}$ lowers the channel barrier P4 of the interposed region 107 of the odd field, similar to that shown in FIG. 13A. Therefore, the signal charges Q stored in the photodiodes of the odd field are transferred to the vertical transfer paths $VCT_1$ to $VCT_J$.

Next, after this signal charge transfer, the vertical transfer paths $VCT_J$ start vertical transfer synchronously with the four-phase drive signals changing in a voltage range equal to or lower than the threshold voltage Vth. During this vertical transfer, the channel barriers P4 under all the interposed regions 107 become high so that the channels between the photodiodes $PD_{1,1}$ to $PD_{I,J}$ and vertical transfer paths $VCT_1$ to $VCT_J$ become perfectly non-conductive.

Next, during the period $\tau_{ST}$, the electronic shutter signal OFD of the substrate voltage control signal $V_{OFD}$ is applied to the n-type semiconductor substrate 103. Therefore, as shown in FIG. 13B, because of this voltage $V_{OFD3}$, all the potential barriers P2 corresponding to the photodiodes $PD_{1,1}$ to $PD_{I,J}$ become low so that the unnecessary charges Q left in the photodiodes $PD_{1,1}$ to $PD_{I,J}$ are drained to the n-type semiconductor substrate 103.

Next, the substrate voltage control signal $V_{OFD}$ takes again the voltage $V_{OFD2}$ so that the potential barrier P2 takes a level corresponding to the voltage $V_{OFD2}$ as shown in FIG. 13C, so that the charges Q are stored in the photodiodes $PD_{1,1}$ to $PD_{I,J}$. The level of the potential barrier P2 changed by the voltage $V_{OFD2}$ is slightly lower than the channel barrier P4 under the interposed region 107. During the period $\tau_{PD}$ until the odd field read period $\tau_{ODD}$ is terminated, the potential profile shown in FIG. 13C is maintained.

During the exposure period $\tau_{PD}$ while charges are generated and accumulated, as shown in FIG. 13C, the potential barrier P2 is lower than the channel barrier P4. Therefore, even if excessive charges are generated in the photodiodes $PD_{1,1}$ to $PD_{I,J}$ upon incidence of strong (excessive) light, the excessive charges pass over the potential barrier P2 and are drained to the n-type semiconductor substrate 103. The excessive charges are not leaked to the vertical transfer paths $VCT_1$ to $VCT_J$ so that the sensor blooming phenomenon can be avoided.

As above, during the field read periods $\tau_{EVEN}$ and $\tau_{ODD}$ of the monitor mode period Tmon, the charge generation/accumulation period $\tau_{ST}$ is set after the unnecessary charges are drained by using the electronic shutter signal OFD. Signal charges with the noise component being suppressed can therefore be obtained. By reproducing the pixel signal Vout and displaying the image on a liquid crystal monitor or the like of the electronic still camera, an object image of high quality can be observed.

Furthermore, since the potential barrier P2 is set slightly lower than the channel barrier P4, the excessive charges are not leaked to the vertical transfer paths $VCT_1$ to $VCT_J$. Therefore, the sensor blooming phenomenon that vertical stripes are formed in a reproduced image displayed on the liquid crystal monitor or the like can be avoided, and the image of high quality can be displayed on the monitor.

When the shutter button switch 142 of the electronic still camera is depressed at any timing during the monitor mode period Tmon, e.g., at a timing t3 shown in FIG. 12, the reference voltage signal $V_{BIAS}$ of the electronic volume adjusting circuit 115 is synchronously switched to the voltage $V_{OFD1}$. Thereafter, the photographing mode period $T_{EX}$ starts synchronously with the next field read period $\tau_{EXP}$.

If the timing t3 when the shutter button switch 42 is depressed is during the odd field read period $\tau_{ODD}$, the field read period $\tau_{EXP}$ corresponds to the even field read period, whereas if the timing t3 when the shutter button switch 42 is depressed is during the even field read period $\tau_{EVEN}$, the field read period $\tau_{EXP}$ corresponds to the odd field read period.

During the field read period $\tau_{EXP}$, the bias voltage level of the substrate voltage control signal $V_{OFD}$ is $V_{OFD1}$. The largest amplitude $V_{OFD4}$ of the signal $V_{OFD}$ with the electronic shutter signal OFD superposed upon the voltage $V_{OFB1}$ is $V_{OFD1}+\phi_{OFD}$. The electronic shutter signal OFD is output from the electronic shutter timing generator circuit 116 at the same timing as that during the field read periods $\tau_{EVEN}$ and $\tau_{ODD}$ of the monitor mode period Tmon.

As the electronic shutter signal OFD is applied to the n-type semiconductor substrate 103, the potential barriers P2 of the photodiodes $PD_{1,1}$ to $PD_{I,J}$ become lower, similar to the case shown in FIG. 13A. Therefore, the unnecessary charges left in the photodiodes $PD_{1,1}$ to $PD_{I,J}$ are drained to the n-type semiconductor substrate 103.

After the electronic shutter signal OFD is applied, the mechanical shutter MC is closed immediately after the lapse of a period $\tau_{ON}$ corresponding to a shutter speed set in the electronic still camera. This period $\tau_{ON}$ is therefore an exposure time for still image photographing.

Figure 13D:
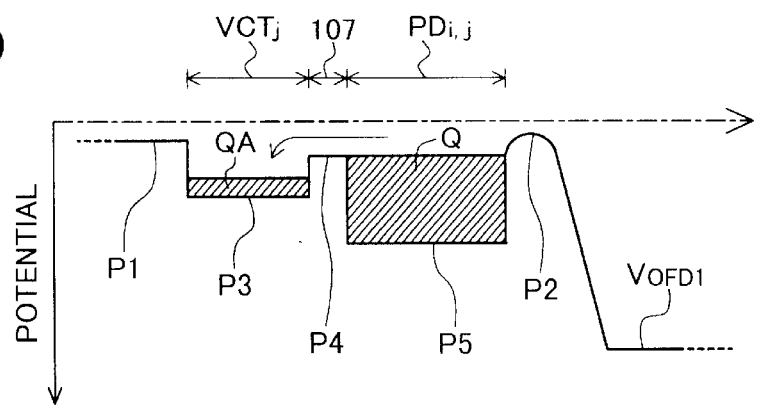

During the exposure period $\Delta_{ON}$, the substrate voltage control signal $V_{OFD}$ takes the voltage $V_{OFD1}$ so that as shown in FIG. 13D, the potential barrier P2 becomes high. However, the level of the potential barrier P2 is higher than the level of the channel barrier P4 so that the maximum charge amount capable of being stored in the photodiodes $PD_{1,1}$ to $PD_{I,J}$, i.e., the saturated charge amount, is determined by the level of the channel barrier P4. The saturated charge amount is therefore increased more than the case wherein the level of the potential barrier P2 is set lower than the level of the channel barrier P4.

Next, during a predetermined period $\tau_D$, the four-phase drive signals V1 to V4 and two-phase drive signals H1 and H2 are speeded up (made to have a shorter period) more than the normal read period to make the vertical transfer paths $VCT_1$ to $VCT_J$ and horizontal transfer path HCT transfer signal charges at high speed. In place of the four-phase drive signals V1 to V4, the vertical transfer paths $VCT_1$ to $VCT_J$ may be driven synchronously with two-phase drive signals to perform a high speed charge transfer.

Figure 13E:
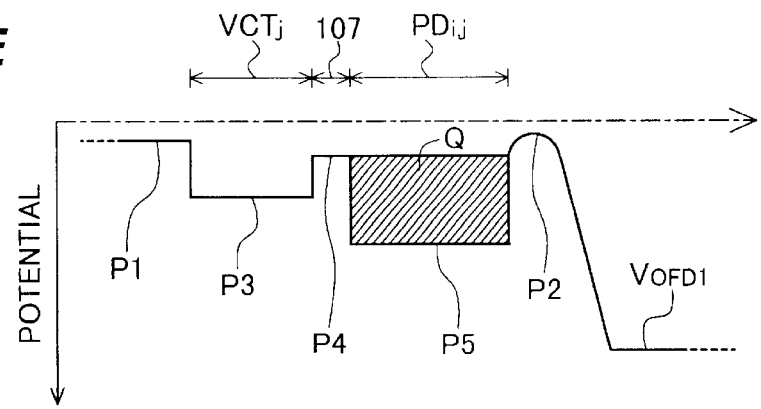

With such high speed charge transfer, the unnecessary signal charges QA leaked to the vertical transfer paths $VCT_1$ to $VCT_J$ are drained to the external circuit. As shown in FIG. 13E, the unnecessary signal charges are therefore removed from the vertical transfer paths $VCT_1$ to $VCT_J$ and horizontal transfer path HCT.

During the next odd field read period $\tau_{ODD}$ after the unnecessary charges QA are drained, the signal charges of the photodiodes of the odd field among the photodiodes $PD_{1,1}$ to $PD_{I,J}$ are transferred to the vertical transfer paths $VCT_1$ to $VCT_J$ and are vertically and horizontally transferred by the vertical transfer paths $VCT_1$ to $VCT_J$ and horizontal transfer path HCT.

Next, during the next unnecessary charge drain period $\tau_D$ after the odd field read period $\tau_{ODD}$, high speed charge transfer is performed by the vertical transfer paths $VCT_1$ to $VCT_J$ and horizontal transfer path HCT to remove the unnecessary charges in these paths.

During the next even field read period $\tau_{EVEN}$, the signal charges of the photodiodes of the even field among the photodiodes $PD_{1,1}$ to $PD_{I,J}$ are transferred to the vertical transfer paths $VCT_1$ to $VCT_J$ and are vertically and horizontally transferred by the vertical transfer paths $VCT_1$ to $VCT_J$ and horizontal transfer path HCT.

After the completion of the odd and even field read operations, the photographing mode period $\tau_{EX}$ is terminated (refer to a timing t4), and at the same time, the mechanical shutter is opened to again resume the process of the monitor mode period Tmon.

According to ILCCD 1 of this embodiment, during the exposure period $\tau_{ON}$ of the photographing mode period $T_{EX}$, the levels of the potential barriers P2 are made higher than the channel barrier P4. The saturated charge amount of the photodiodes $PD_{1,1}$ to $PD_{I,J}$ can be increased.

Figure 14:
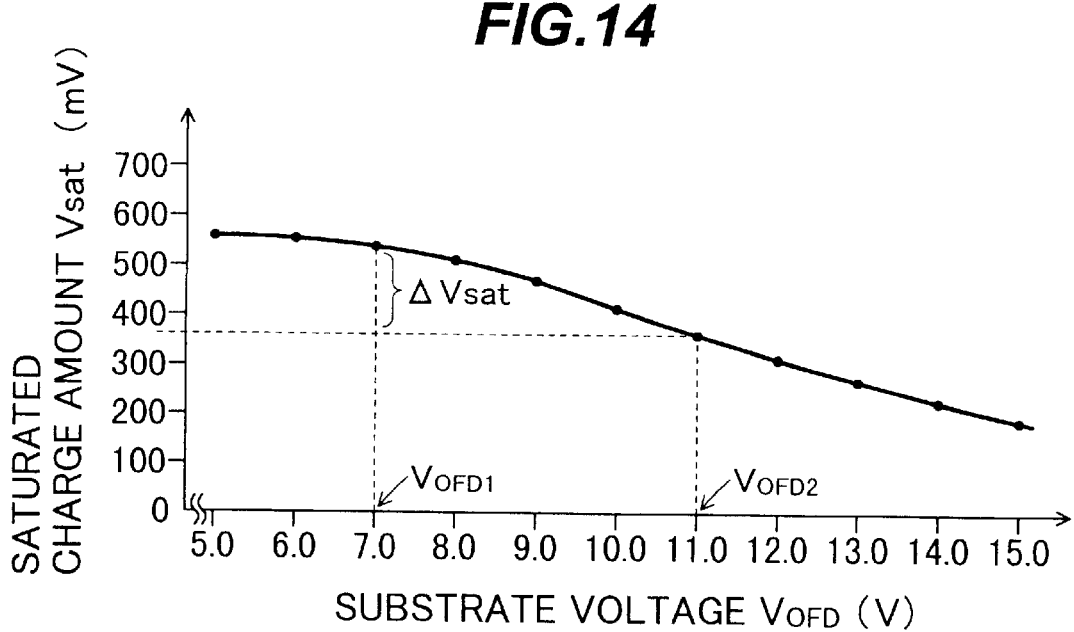
FIG. 14 is a graph illustrating an increase in a saturated charge amount.

FIG. 14 is a graph showing experiment results of the saturated charge amount $V_{SAT}$ relative to the substrate voltage control signal $V_{OFD}$. The saturated charge amount is represented by an output voltage of the output circuit OUT. It was confirmed that the saturated charge amount during exposure while the substrate voltage control signal $V_{OFD}$ was set to the voltage $V_{OFD1}$ to make the potential barrier P2 higher than the channel barrier P4, was increased by $\Delta V_{SAT}$ (about 170 mV) more than the saturated charge amount during exposure while the substrate voltage control signal $V_{OFD}$ was set to the voltage $V_{OFD2}$ to make the potential barrier P2 lower than the channel barrier P4.

Since the unnecessary charges left in the vertical transfer paths $VCT_1$ to $VCT_J$ and horizontal transfer path HCT are drained (refer to the period $\tau_D$) prior to reading the signal charges stored during the exposure period $\tau_{ON}$, a still image of high quality can be obtained by suppressing noise components which may cause blooming or smear.

Furthermore, since exposure during the exposure period $\tau_{ON}$ is performed by setting the potential barrier P2 higher than the channel barrier P4, excessive charges to be caused by strong light incidence may leak to the vertical transfer paths $VCT_1$ to $VCT_J$. However, in this embodiment, signal charges in the photodiodes $PD_{1,1}$ to $PD_{I,J}$ are read after unnecessary charges are removed during the unnecessary charge drain period $\tau_D$. Therefore, a still image suppressing noise components can be obtained.

As above, in the third embodiment, in the exposure during the monitor mode, the channel barrier P4 is set higher than the potential barrier P2 to prevent occurrence of the sensor blooming phenomenon. A clear monitor image can therefore be obtained. In the exposure during the photographing mode, the potential barrier P2 is set higher than the channel barrier P4 to increase the saturated charge amount. A still image having a wide dynamic range can therefore be obtained. Furthermore, during the photographing mode, signal charges are read after unnecessary charges in the vertical transfer paths are removed. A clear image without blooming and smear can therefore be obtained.

(4th Embodiment)

Figure 15A:
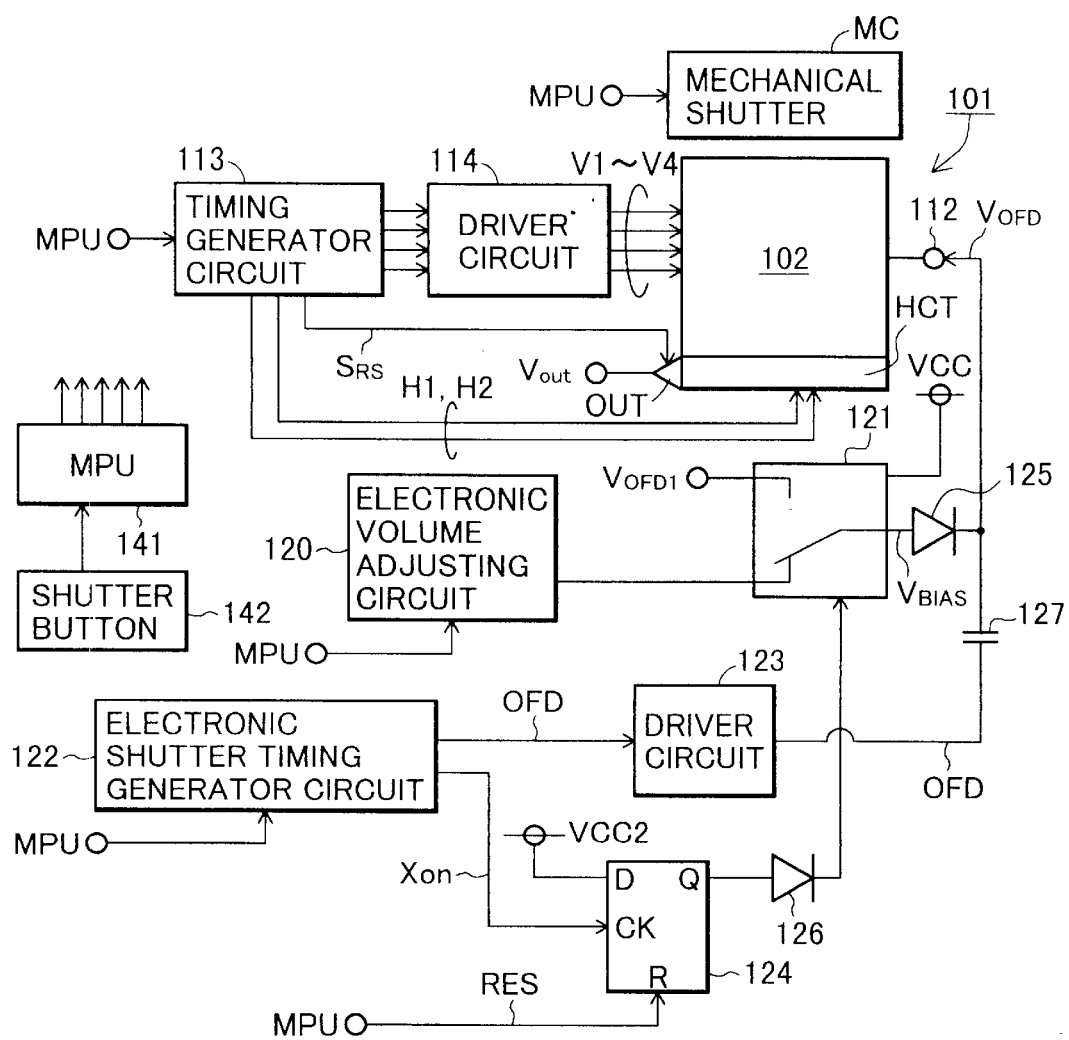
FIGS. 15A and 15B are a graph and a timing chart illustrating the structure and operation of a substrate voltage control circuit according to a fourth embodiment of the invention.
Figure 15B:
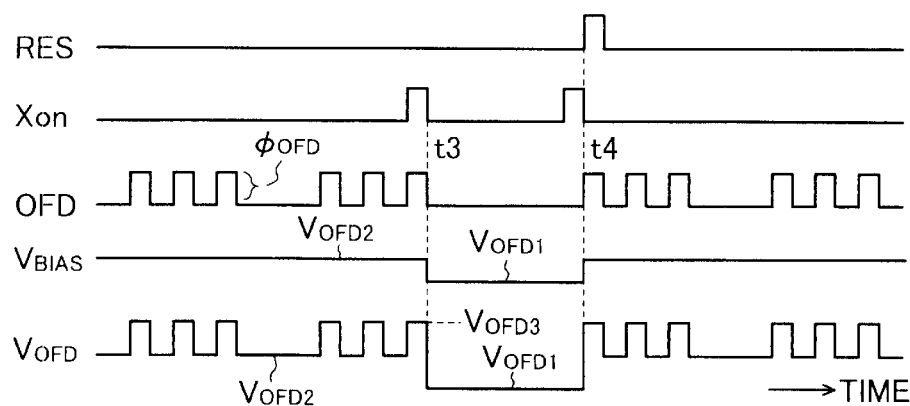
Figure 16:
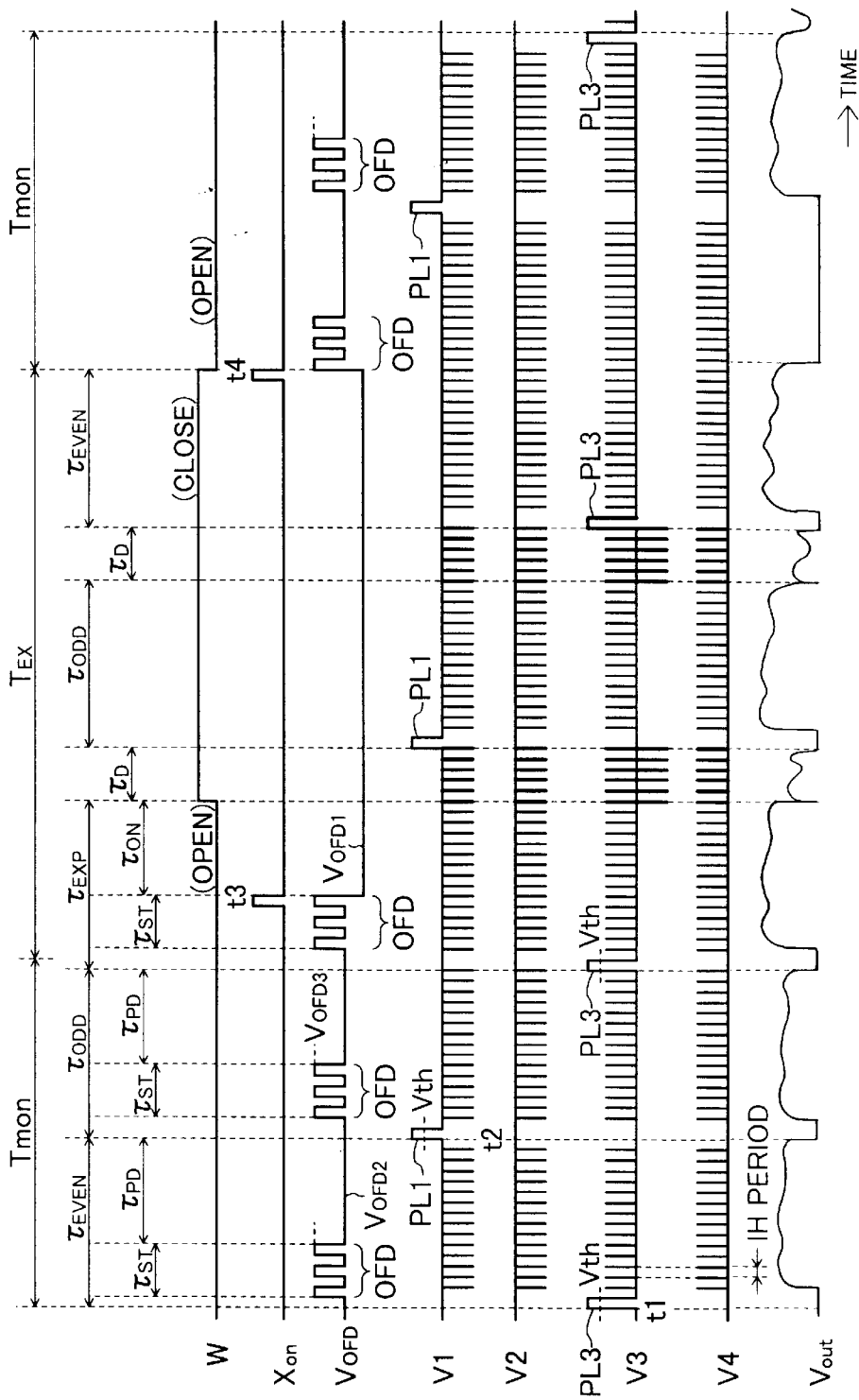
FIG. 16 is a timing chart illustrating the operation of the solid state image pickup device of the fourth embodiment applied to an electronic still camera.

Next, with reference to FIGS. 15A, 15B, and 16, a solid state image pickup device of the second embodiment will be described. In FIGS. 15A, 15B, and 16, identical or corresponding elements to those shown in FIGS. 11A, 11B, and 12 are represented by the same reference numerals and symbols.

In the solid state image pickup device of the second embodiment, the substrate voltage control circuit has a structure different from the third embodiment, and other structures are similar to those of the third embodiment.

Referring to FIG. 15A, the substrate voltage control circuit of the embodiment is constituted of an electronic volume adjusting circuit 120, an analog switch 121, an electronic shutter timing generator circuit 122, a driver circuit 123, a D-type flip-flop (hereinafter described as DFF) 124, a rectifying diode 125, and a coupling capacitor 127.

The electronic volume adjusting circuit 120 is a variable voltage source which outputs a d.c. voltage $V_{OFD2}$ having a value designated by a microprocessor 141 of the electronic still camera.

As shown in FIG. 15B, the electronic shutter timing generator circuit 122 generates a timing pulse signal Xon which takes a logical level "H" at a timing t3 when a shutter button switch 142 of the electronic still camera is depressed and at a timing t4 when the mechanical shutter MC is switched from the open state to the close state.

Synchronously with an instruction from the microprocessor 141, the electronic shutter timing generator circuit 122 outputs an electronic shutter signal OFD having a set of three rectangular pulses such as shown in FIG. 15B. This rectangular signal changes between high and low levels synchronously with the one horizontal scan period (1H period). An amplitude of the high level is set to $\phi_{OFD}$. The electronic shutter signal OFD output from the electronic shutter timing generator circuit 122 is power-amplified and supplied to the coupling capacitor 127.

Synchronously with the timing pulse signal Xon, DFF 124 alternately changes the logical level of an output Q which is supplied via the rectifying diode 126 to the analog switch 121 as a switching control signal. In response to a reset signal RES supplied from the microprocessor 141 to a reset terminal R of DFF 124 synchronously with the timing t4 when the mechanical shutter MC changes from the open state to the close state, an output (output terminal Q) is generated synchronously with the open/close state of the mechanical shutter MC.

The analog switch 121 is a two-input, one-output switch. One input contact of the analog switch 121 is supplied with a fixed d.c. voltage $V_{OFD1}$, and the other input contact is supplied with a d.c. voltage $V_{OFD2}$ from the electronic volume adjusting circuit 120. The analog switch 121 is switched synchronously with the output Q of DFF 124 to thereby output a reference voltage signal $V_{BIAS}$ of either the voltage $V_{OFD1}$ or $V_{OFD2}$.

The reference voltage signal $V_{BIAS}$ output from the analog switch 121 and the electronic shutter signal OFD output from the driver circuit 123 are added together by the rectifying diode 125 and coupling capacitor 127 to thereby form the substrate voltage control signal $V_{OFD}$ such as shown in FIG. 15B which is supplied to the substrate voltage control terminal 112 of ILCCD 101.

When the reference voltage signal $V_{BIAS}$ is switched to the d.c. voltage $V_{OFD1}$, the bias voltage level of the substrate voltage control signal $V_{OFD}$ takes $V_{OFD2}$ and the largest amplitude $V_{OFD3}$ of the signal $V_{OFD}$ superposing the electronic shutter signal OFD becomes $V_{OFD2}+\phi_{OFD}$. When the reference voltage signal $V_{BIAS}$ is switched to the d.c. voltage $V_{OFD2}$, the electronic shutter signal OFD is disabled and not superposed so that the signal $V_{OFD}$ is equal to the d.c. voltage $V_{OFD1}$.

Next, with reference to the timing chart of FIG. 16, the operation of the electronic still camera with ILCCD of this embodiment will be described. The electronic still camera has a monitor mode and a photographing mode similar to the third embodiment.

During the monitor mode period Tmon, the even field read period $\tau_{EVEN}$ and $\tau_{ODD}$ are repeated under the conditions that the mechanical shutter MC of the electronic still camera is set to the open state and that the substrate voltage control signal $V_{OFD}$, four-phase drive signals V1 to V4, and two-phase drive signals H1 and H2 are generated at timings similar to the third embodiment.

In the field read periods $\tau_{EVEN}$ and $\tau_{ODD}$, signal charges photo-excited and stored in the photodiodes $PD_{1,1}$ to $PD_{I,J}$ are transferred during the vertical blanking periods to the vertical transfer paths $VCT_1$ to $VCT_J$, synchronously with transfer pulses PL1 and PL3 higher than a predetermined threshold voltage Vth, and thereafter, vertical and horizontal transfer operations start. During the period $\tau_{ST}$, the substrate voltage control signal $V_{OFD}$ of the d.c. voltage $V_{OFD2}$ superposing the electronic shutter signal OFD having the amplitude of $\phi_{OFD}$ is applied to the n-type semiconductor substrate 103 of ILCCD 101, to thereby drain unnecessary charges. During the period $\tau_{PD}$, charge generation and accumulation are performed by the photodiodes $PD_{1,1}$ to $PD_{I,J}$.

During the exposure period $\tau_{PD}$ of the monitor mode period Tmon, the substrate voltage control signal $V_{OFD}$ takes the voltage $V_{OFD2}$ so that as shown in FIG. 13C, the potential barrier P2 becomes slightly lower than the channel barrier P4. Therefore, even if excessive charges are generated in the photodiodes $PD_{1,1}$ to $PD_{I,J}$ upon incidence of strong light, the excessive charges pass over the potential barrier P2 and are drained to the n-type semiconductor substrate 103. The excessive charges are not leaked to the vertical transfer paths $VCT_1$ to $VCT_J$ so that the sensor blooming phenomenon can be avoided which otherwise forms vertical stripes on a reproduced image displayed on a liquid crystal display or the like of the electronic still camera. An image of high quality can therefore be displayed on the monitor.

When the shutter button switch 142 of the electronic still camera is depressed at any timing during the monitor mode period Tmon, unnecessary charges are drained synchronously with the electron shutter signal OFD during the period $\tau_{ST}$ of the field read period $\tau_{Exp}$ next to the field read period when the shutter button switch 142 was depressed. After the unnecessary charge drain process is completed (refer to t3), the timing pulse signal Xon is generated.

The mechanical shutter MC is closed immediately after the lapse of a period $\tau_{ON}$ corresponding to a shutter speed set in the electronic still camera. This period $\tau_{ON}$ is therefore an exposure time for still image photographing.

During the exposure period $\Delta_{ON}$, the substrate voltage control signal $V_{OFD}$ takes the voltage $V_{OFD1}$ so that as shown in FIG. 13D, the potential barrier P2 becomes high. However, the level of the potential barrier P2 is higher than the level of the channel barrier P4 so that the maximum charge amount capable of being stored in the photodiodes $PD_{1,1}$ to $PD_{I,J}$ i.e., the saturated charge amount, is determined by the level of the channel barrier P4. The saturated charge amount is therefore increased.

After the exposure period $\Delta_{ON}$ is terminated, during the period $\Delta_D$, unnecessary charges in the vertical transfer paths $VCT_1$ to $VCT_J$ and horizontal path HCT are removed. Thereafter, the odd field is read during the odd field read period $\Delta_{ODD}$. During the next period $\Delta_D$, unnecessary charges in the vertical transfer paths $VCT_1$ to $VCT_J$ and horizontal path HCT are removed. Thereafter, the even field is read during the even field read period $\Delta_{EVEN}$. With the above operations, the still image photographing is completed.

After the still image photographing (refer to timing t4), the mechanical shutter MC is again opened, and at the same time the timing pulse signal Xon is generated to again perform the process of the monitor mode period Tmon.

As above, in the solid state image pickup device of this embodiment, during the exposure $\Delta_{ON}$, the level of the potential barrier P2 is set higher than the level of the channel barrier P4. It is therefore possible to increase the saturated charge amount of the photodiodes $PD_{1,1}$ to $PD_{I,J}$.

Furthermore, during the exposure period $\tau_{ON}$, the potential barrier P2 is set higher than the channel barrier P4. In this case, excessive charges generated upon incidence of strong light may be leaked to the vertical transfer paths $VCT_1$ to $VCT_J$. However, since the signal charges of the photodiodes $PD_{1,1}$ to $PD_{I,J}$ are read after unnecessary charges are removed during the unnecessary charge drain period $\tau_D$, a still image suppressing noise component can be obtained.

(5th Embodiment)

Next, with reference to FIGS. 17A to 18C, a solid state image pickup device of the fifth embodiment will be described. In FIGS. 17A to 18C, identical or corresponding elements to those shown in FIGS. 9A and 10A are represented by the same reference numerals and symbols.

In the solid state image pickup device of the third and fourth embodiments, as shown in FIGS. 10A and 10B, the vertical direction overflow drain structure is provided in which the substrate voltage control signal $V_{OFD}$ is applied to the n-type semiconductor substrate 103 to control the level of the potential barrier P2 and drain unnecessary charges to the n-type semiconductor substrate 103.

Figure 17A:
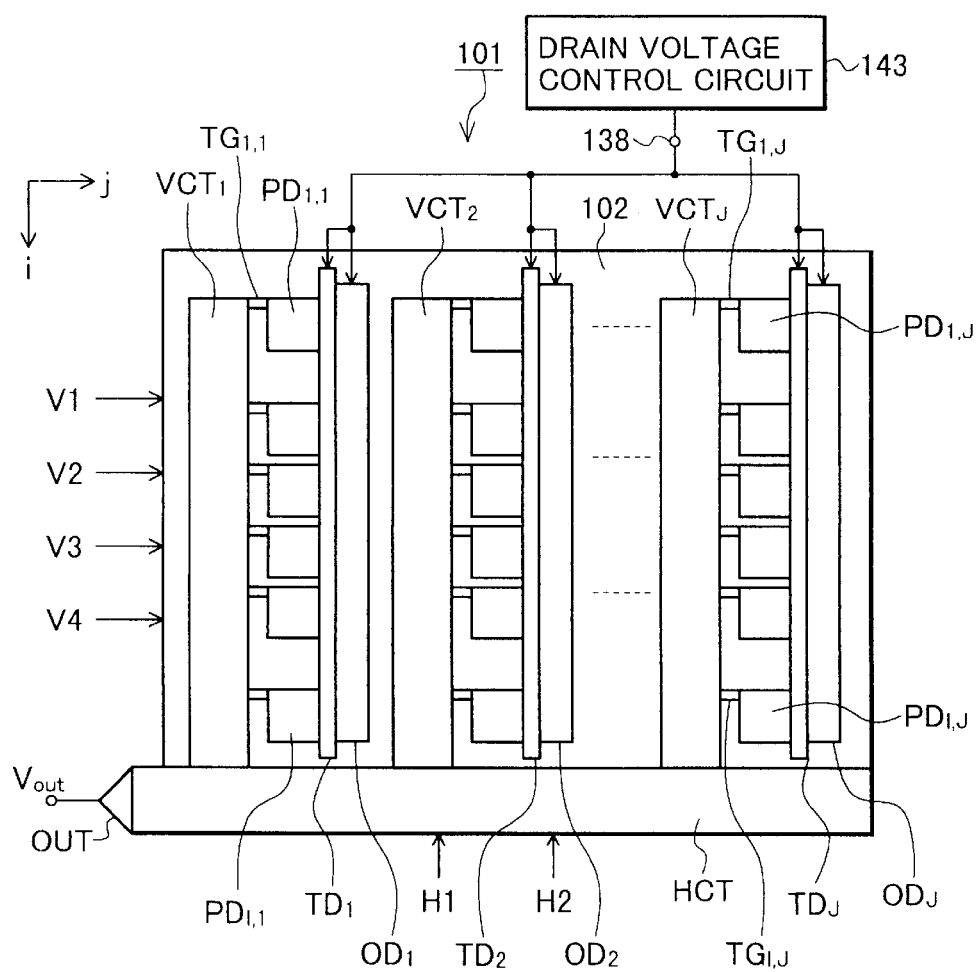
FIGS. 17A and 17B are a plan view and a cross sectional view showing the structure of a solid state image pickup device according to a fifth embodiment of the invention.

In the solid state image pickup device of the fifth embodiment, as shown in FIG. 17A, a lateral direction overflow drain structure is provided in which a control voltage is not applied to a semiconductor substrate 19, but transfer gates $TD_1$ to $TD_J$ and overflow drains $OD_1$ to $OD_J$ extending in the vertical direction i are formed on the right side of the photodiodes $PD_{1,1}$ to $PD_{I,J}$ to drain unnecessary charges to the overflow drains $OD_1$ to $OD_J$. In this case, the terminal for applying a control voltage to the semiconductor substrate 11 is not provided, but a drain voltage control circuit 143 supplies a signal $V_{OD}$ to the transfer gates $TD_1$ to $TD_J$ and to the overflow drains $OD_1$ to $OD_J$.

By changing the control voltage $V_{OD}$ applied to the transfer gate $TD_1$ to $TD_J$, the level of the potential barrier under the transfer gate $TD_1$ to $TD_J$ is regulated. In this manner, unnecessary charges in the photodiodes $PD_{1,1}$ to $PD_{I,J}$ are drained to the overflow drains $OD_1$ to $OD_J$, or the saturated charge amount of the photodiodes $PD_{1,1}$ to $PD_{I,J}$ is controlled.

Figure 17B:
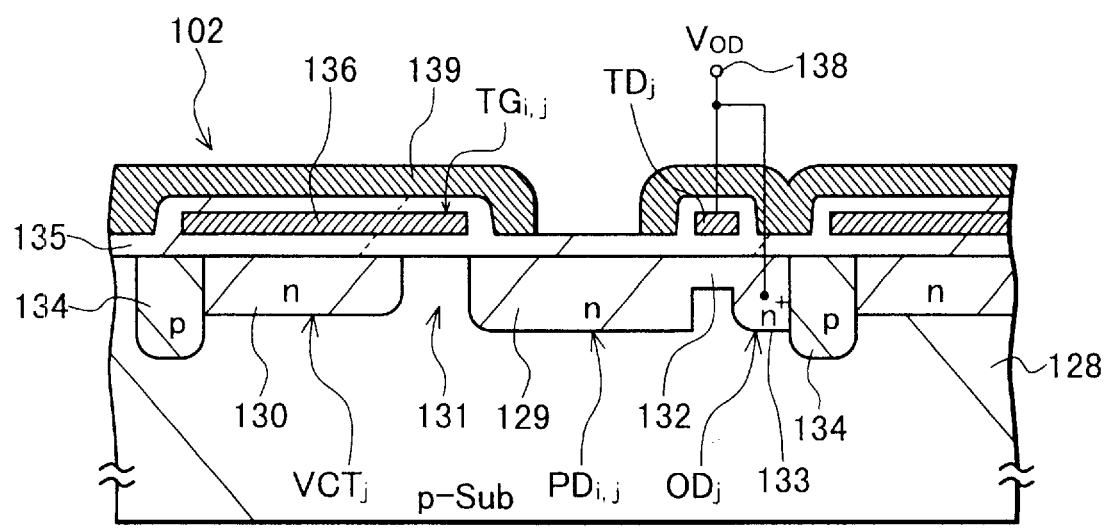

FIG. 17B is a cross sectional view of a representative cell structure of a photodiode $PD_{I,J}$, and adjacent vertical transfer path $VCT_J$, transfer gates $TG_{I,J}$ and $TD_J$, and overflow drain $OD_J$.

Referring to FIG. 17B, in a p-type semiconductor substrate 128, an n-type semiconductor region 129 constituting a portion of the photodiode $PD_{I,J}$ and an n-type semiconductor region 130 constituting the vertical transfer path $VCT_J$ are formed. Between these n-type semiconductor regions 129 and 130, an interposed region 131 constituting a portion of the p-type semiconductor substrate 129 is formed. On the right side of the n-type semiconductor region 129, a thin n-type semiconductor region 23 to be controlled by the transfer $TD_J$ and an $n^+$-type semiconductor region 133 constituting the overflow drain $OD_J$ are formed. On the outer sides of the n-type semiconductor region 130 and $n^+$-type semiconductor region 133, a channel stopper 134 made of a p-type semiconductor region is formed.

Over the n-type semiconductor region 130 and interposed region 131, a transfer electrode 136 to which the four-phase drive signals V1 to V4 are applied is formed with an interlayer insulating film 135 being interposed therebetween. The right end portion of the transfer electrode 136 constitutes the transfer gate $TG_{I,J}$. Over the n-type semiconductor region 132, the transfer gate $TD_J$ to which a control voltage $V_{OD}$ is applied is formed with the interlayer insulating film 135 being interposed therebetween. The surface of the light reception area 102 excepting a predetermined region of the n-type semiconductor region 129 is covered with a light shielding film (aluminum film) 139. The transfer gate $TD_J$ and $n^+$-type semiconductor region 133 are electrically connected to a terminal 138 to which the control voltage $V_{OD}$ is applied.

The other cells have the same cell structure as the above-described cell structure including the photodiode $PD_{I,J}$, adjacent vertical transfer path $VCT_J$, transfer gates $TG_J$ and $TD_J$, and overflow drain $OD_J$.

The terminal 138 is connected to a drain voltage control circuit 143 having a structure similar to the substrate voltage control circuit shown in FIG. 11A or 15A. A drain voltage control signal $V_{OD}$ having a waveform similar to that of the substrate voltage control signal $V_{OFD}$ of the substrate voltage control circuit, is applied to the terminal 138.

Next, the operation of the electronic still camera with the solid state image pickup device of the fifth embodiment will be described. The electronic still camera performs processes of the monitor mode and photographing mode at timings similar to those shown in FIG. 12 or 16. However, in FIG. 12 or 16, the substrate voltage control signal $V_{OFD}$ is the drain voltage control signal $V_{OD}$.

Figure 18A:
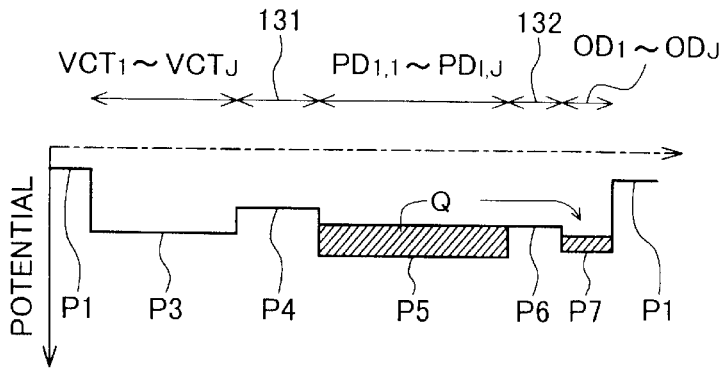
FIGS. 18A to 18C are graphs showing potential profiles illustrating the operation of the solid state image pickup device of the fifth embodiment.

With reference to the timings shown in FIG. 12 or 16, during the exposure period $\tau_{PD}$ of the monitor mode period Tmon, the drain voltage control signal $V_{OD}$ takes the voltage $V_{OFD2}$ which is applied to the transfer gate $TD_1$ to $TD_J$ so that as shown in FIG. 18A, the potential barrier P6 of the region 132 under the transfer gate $TD_1$ to $TD_J$ becomes slightly lower than the channel barrier P4 of the region 131 under the transfer gate $TG_{1,1}$ to $TG_{I,J}$. Therefore, even if excessive charges Q shown hatched are generated in the photodiodes $PD_{1,1}$ to $PD_{I,J}$ upon incidence of strong light during the exposure period $\tau_{PD}$, the excessive charges Q pass over the potential barrier P6 and are drained to the overflow drains $OD_1$ to $OD_J$. The excessive charges are not leaked to the vertical transfer paths $VCT_1$ to $VCT_J$ so that the sensor blooming phenomenon can be avoided which otherwise forms vertical stripes on a reproduced image displayed on a liquid crystal display or the like of the electronic still camera. An image of high quality can therefore be displayed on the monitor.

Figure 18B:
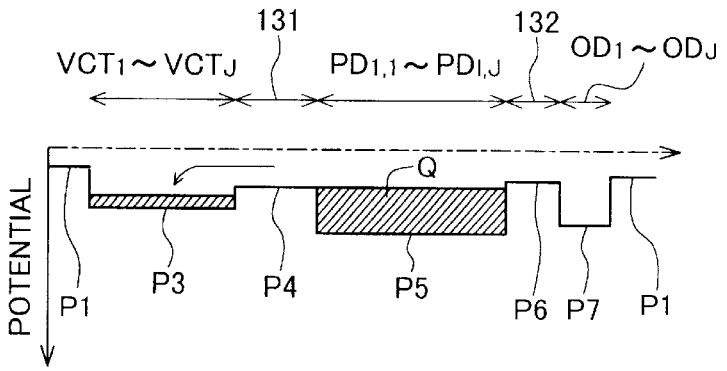
Figure 18C:
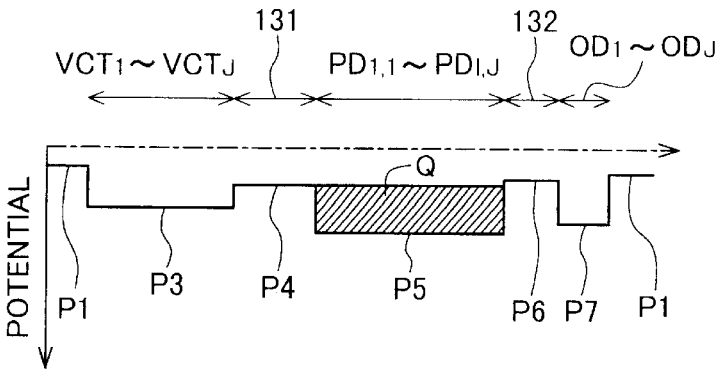

During the still image photographing exposure period $\Delta_{ON}$ of the photographing mode period $T_{EX}$, the drain voltage control signal $V_{OD}$ takes the voltage $V_{OFD1}$ which is applied to the transfer gates $TD_1$ to $TD_J$ so that as shown in FIG. 18B, the potential barrier P6 of the region 132 becomes higher than the channel barrier P4 of the region 131. The saturated charge amount of the photodiodes $PD_{1,1}$ to $PD_{I,J}$ can therefore be increased. Furthermore, the signal charges are read during the exposure period $\tau_{ON}$ after unnecessary charges are removed during the unnecessary charge drain period $\tau_D$. As shown in FIG. 18C, since the signal charges in the photodiodes $PD_{1,1}$ to $PD_{I,J}$ are read after unnecessary charges are removed, a still image suppressing noise component can be obtained.

As above, in this embodiment, the overflow drains $OD_1$ to $OD_J$ are formed adjacent to the photodiodes $PD_{1,1}$ to $PD_{I,J}$, with the transfer gates $TD_1$ to $TD_J$ being interposed therebetween. The level of the potential barrier under the transfer gate $TD_1$ to $TD_J$ is set higher than the channel barrier P4 under the transfer gate $TG_{1,1}$ to $TG_{I,J}$ to perform exposure for a still image. The saturated charge amount of the photodiodes $PD_{1,1}$ to $PD_{I,J}$ can therefore be increased.

As described above, the third to fifth embodiments can increase the saturated charge amount of the light reception elements more than a conventional solid state image pickup device. It is possible to manufacture a solid image pickup device having excellent properties such as wide dynamic range and high sensitivity.

The embodiments are particularly effective for manufacture of a solid state pickup device having a large number of pixels with a small light reception area and hence a small signal charge amount, because the embodiments realize an increased saturated charge amount.

The present invention has been described in connection with the preferred embodiments. The invention is not limited only to the above embodiments. It is apparent that various modifications, improvements, combinations, and the like can be made by those skilled in the art.

What is claimed is:

1. A method of controlling a solid state image pickup device of an interlace type, the solid state image pickup device including a semiconductor substrate formed with at least:

light reception elements disposed in two-dimensional rows and columns for performing charge generation and accumulation through photoelectric conversion, the light reception elements being assigned to first and second fields;

a plurality of vertical charge transfer paths for transferring the charges generated by the light reception elements, each vertical transfer path being provided in correspondence with each light reception column;

overflow drain regions capable of draining charges in the light reception elements;

a first semiconductor region between each light reception element and a corresponding vertical charge transfer path;

a second semiconductor region between each light reception element and a corresponding overflow drain region; and a transfer gate provided for each light reception element for transferring charges in each light reception element to a corresponding vertical charge transfer path by controlling a potential of the first semiconductor region, the transfer gate being formed over the first semiconductor region with an insulating film being interposed therebetween, and the method comprising the steps of:

(a) generating and accumulating charges in each light reception element in the first and second fields, by setting a potential of the second semiconductor region to a first potential and by setting a potential of the first semiconductor region higher than the first potential;

(b) transferring the charges in each light reception element in the first field to the vertical charge transfer paths, by lowering the potential of the first semiconductor region corresponding to the light reception element in the first field;

(c) transferring the charges corresponding to the first field in the vertical charge transfer paths, by setting a potential of the second semiconductor region higher than a second potential higher than the first potential;

(d) transferring the charges in each light reception element in the second field to the vertical charge transfer paths, by lowering the potential of the first semiconductor region corresponding to the light reception element in the second field;

(e) transferring the charges corresponding to the first field in the vertical charge transfer paths; and (f) directly draining substantially all charges in each light reception element to corresponding overflow drain region.

2. A method of controlling a solid state image pickup device according to claim 1, wherein said step (b) transfers the charges by setting the potential of the second semiconductor region to the first or second potential.

3. A method of controlling a solid state image pickup device according to claim 1, wherein:

the solid state image pickup device comprises light interception/transmission means for switching between interception and transmission of incidence light to the light reception elements;

said step (b) generates charges in the light reception elements in a state that the incidence light to the light reception elements is transmitted; and said step (c) transfers the charges in a state that the incidence light to the light reception elements is intercepted.

4. A method of controlling a solid state image pickup device of an interlace type, the solid state image pickup device including a semiconductor substrate formed with at least:

light reception elements disposed in two-dimensional rows and columns for performing charge generation and accumulation through photoelectric conversion, the light reception elements being assigned to first and second fields;

a plurality of vertical charge transfer paths for transferring the charges generated by the light reception elements, each vertical transfer path being provided in correspondence with each light reception column;

overflow drain regions capable of draining charges in the light reception elements;

a first semiconductor region between each light reception element and a corresponding vertical charge transfer path;

a second semiconductor region between each light reception element and a corresponding overflow drain region; and a transfer gate provided for each light reception element for transferring charges in each light reception element to a corresponding vertical charge transfer path by controlling a potential of the first semiconductor region, the transfer gate being formed over the first semiconductor region with an insulating film being interposed therebetween, and the method comprising the steps of:

(a) generating and accumulating charges in each light reception element in the first and second fields, by setting a potential of the second semiconductor region to a first potential and by setting a potential of the first semiconductor region higher than the first potential;

(b) transferring the charges in each light reception element in the first field to the vertical charge transfer paths, by lowering the potential of the first semiconductor region corresponding to the light reception element in the first field:

(c) transferring the charges corresponding to the first field in the vertical charge transfer paths, by setting a potential of the second semiconductor region higher than a second potential higher than the first potential;

(d) transferring the charges in each light reception element in the second field to the vertical charge transfer paths, by lowering the potential of the first semiconductor region corresponding to the light reception element in the second field; and (e) transferring the charges corresponding to the first field in the vertical charge transfer paths, wherein the second potential set in said step (c) is higher than the potential of the first semiconductor region.

5. A method of controlling a solid state image pickup device according to claim 1, further comprising the step of:

(f) selecting either a first mode or a second mode, said steps (a) to (e) being executed when the first mode is selected, and the second mode being executed when the second mode is selected, wherein the second mode comprises the steps of:

(g) generating and accumulating charges in each light reception element in the first field, by raising the potential of the first semiconductor region corresponding to each light reception element in the first field;

(h) transferring the charges in each light reception element in the first field to the vertical charge transfer paths, by lowering the potential of the first semiconductor region corresponding to the light reception element in the first field;

(i) transferring the charges corresponding to the first field in the vertical charge transfer paths;

(j) after said step (h), starting generating and accumulating charges in each light reception element in the second field;

(k) transferring the charges in each light reception element in the second field to the vertical charge transfer paths, by lowering the potential of the first semiconductor region corresponding to the light reception element in the second field; and (l) transferring the charges corresponding to the second field in the vertical charge transfer paths.

6. A method of controlling a solid state image pickup device according to claim 5, wherein the first mode is a photographing mode for photographing a still image of an object and the second mode is a monitor mode for observing in real time the object displayed on a display.

7. A solid state image pickup device including a semiconductor substrate formed with at least:

light reception elements disposed in two-dimensional rows and columns for performing charge generation and accumulation through photoelectric conversion, the light reception elements being assigned to first and second fields;

a plurality of vertical charge transfer paths for transferring the charges generated by the light reception elements, each vertical transfer path being provided in correspondence with each light reception column;

overflow drain regions capable of draining charges in the light reception elements;

a first semiconductor region between each light reception element and a corresponding vertical charge transfer path;

a second semiconductor region between each light reception element and a corresponding overflow drain region; and a transfer gate provided for each light reception element for transferring the charges in each light reception element to a corresponding vertical charge transfer path by controlling a potential of the first semiconductor region, the transfer gate being formed over the first semiconductor region with an insulating film being interposed therebetween, and the solid state image pickup device comprising:

interlace charge reading means for generating charges in the light reception elements in the first and second fields, transferring the charges in each light reception element in the first field to a corresponding vertical charge transfer path and transferring the charges corresponding to the first field in the vertical charge transfer paths, and thereafter, transferring the charges in each light reception element in the second field to a corresponding vertical charge transfer path and transferring the charges corresponding to the second field in the vertical charge transfer paths; and potential setting means for setting a potential of the second semiconductor region to a first potential when charges are generated in the light reception elements in the first and second fields, and setting the potential of the second semiconductor region to a second potential higher than the first potential when the charges corresponding to the first field are transferred in the vertical charge transfer paths, wherein substantially all charges in each light reception element are directly drained to corresponding overflow drain region.

8. A solid state image pickup device according to claim 7, wherein each overflow drain region is positioned deeper than a corresponding light reception element in the semiconductor substrate, and said potential setting means sets the potential of the second semiconductor region by controlling a voltage applied to the semiconductor substrate.

9. A solid state image pickup device according to claim 7, wherein each overflow drain region is formed at a position spaced apart in a horizontal direction from a corresponding light reception element in the semiconductor substrate, the solid state image pickup device further comprises a drain gate formed over the second semiconductor region with an insulating film being interposed therebetween, and said potential setting means sets the potential of the second semiconductor region by controlling a voltage applied to the drain gate.

10. A solid state image pickup device including a semiconductor substrate formed with at least:

light reception elements for generating charges through photoelectric conversion;

vertical charge transfer paths for transferring the charges generated by the light reception elements;

overflow drain regions for draining charges in the light reception elements;

a first semiconductor region between each light reception element and a corresponding vertical charge transfer path;

a second semiconductor region between each light reception element and a corresponding overflow drain region; and a transfer gate for transferring the charges in each light reception element to a corresponding vertical charge transfer path by controlling a potential of the first semiconductor region, the transfer gate being formed over the first semiconductor region with an insulating film being interposed therebetween, and the solid state image pickup device comprising control means for generating and accumulating charges in each light reception element, by setting the potential of the first semiconductor region to a first potential lower than a potential of the second semiconductor region, wherein substantially all charges in each light reception element are directly drained to corresponding overflow drain region.

11. A solid state image pickup device according to claim 10, wherein said control means transfers unnecessary charges in the vertical charge transfer paths in a state that the charges are generated and accumulated in each light reception element by setting the potential of the first semiconductor region to the first potential.

12. A solid state image pickup device according to claim 11, further comprising light transmission/interception means for transmitting or intercepting incidence light to each light reception element, wherein said control means operates to generate charges in each light reception element in a state that the incidence light to the light reception elements is transmitted, and to transfer the unnecessary charges in the vertical charge transfer paths in a state that the incidence light to the light reception elements is intercepted.

13. A solid state image pickup device according to claim 11, wherein said control means operates to remove the unnecessary charges in the vertical charge transfer paths, thereafter to transfer the charges in each light reception element to the vertical charge transfer paths by setting the potential of the first semiconductor region to a second potential lower than the first potential, and to transfer the charges in the vertical transfer paths.

14. A solid state image pickup device according to claim 12,
wherein said control means operates to remove the unnecessary charges in the vertical charge transfer paths, thereafter to transfer the charges in each light reception element to the vertical charge transfer paths by setting the potential of the first semiconductor region to a second potential lower than the first potential in a state that the incidence light to the light reception elements is intercepted, and to transfer the charges in the vertical charge transfer paths.

15. A solid state image pickup device according to claim 12, wherein:
the light reception elements are assigned to first and second fields; and
said control means operates to remove the unnecessary charges in the vertical charge transfer paths, thereafter to transfer the charges in each light reception element of the first field to the vertical charge transfer paths in a state that the incidence light to the light reception elements in the first and second fields is intercepted, to transfer the charges of the first field in the vertical charge transfer paths, thereafter to transfer the charges in each light reception element of the second field to the vertical charge transfer paths, and to transfer the charges of the second field in the vertical charge transfer paths.

16. A solid state image pickup device according to claim 15, wherein said control means operates to transfer the unnecessary charges in the vertical charge transfer paths in a state that the incidence light to the light reception elements of the first and second fields is intercepted, after the charges of the first field are transferred in the vertical charge transfer paths and before the charges in each light reception element of the second field are transferred to the vertical charge transfer paths.

17. A solid state image pickup device according to claim 12, wherein said control means operates to drain charges in each light reception element to a corresponding overflow drain region by lowering a potential of the second semiconductor region, and thereafter to generate and accumulate charges in each light reception element by raising the potential of the second semiconductor region.

18. A solid state image pickup device according to claim 10, wherein each overflow drain region is formed at a deeper position than a corresponding light reception element in the semiconductor substrate, and said control means sets the potential of the second semiconductor region by controlling a voltage applied to the semiconductor substrate.

19. A solid state image pickup device according to claim 10, wherein each overflow drain region is formed at a position spaced apart in a horizontal direction from a corresponding light reception element in the semiconductor substrate, and the solid state image pickup device further comprises a drain gate formed over the second semiconductor region with an insulating film being interposed therebetween, and said control means sets a potential of the second semiconductor region by controlling a voltage applied to the semiconductor substrate.

20. A solid state image pickup device including a semiconductor substrate formed with at least:
light reception elements for generating charges through photoelectric conversion;
vertical charge transfer paths for transferring the charges 2 0 generated by the light reception elements;
overflow drain regions for draining charges in the light reception elements;
a first semiconductor region between each light reception element and a corresponding vertical charge transfer path;
a second semiconductor region between each light reception element and a corresponding overflow drain region; and
a transfer gate for transferring the charges in each light reception element to a corresponding vertical charge transfer path by controlling a potential of the first semiconductor region, the transfer gate being formed over the first semiconductor region with an insulating film being interposed therebetween, and
the solid state image pickup device comprising:
select means for selecting either a monitor mode of observing in real time an image of an object on a display or a photographing mode of photographing a still image of the object; and
control means for generating and accumulating charges in each light reception element, by setting a potential of the second semiconductor region to a first potential lower than the potential of the first semiconductor region, when the monitor mode is selected, and for generating and accumulating charges in each light reception element, by setting the potential of the second semiconductor region higher than the first potential, when the photographing mode is selected.

21. A solid state image pickup device according to claim 20, wherein said control means operates to generate and accumulate charges in each light reception element, by setting the potential of the second semiconductor region higher than the potential of the first semiconductor region, when the photographing mode is selected.

22. A solid state image pickup device according to claim 21, wherein said control means operates to drain charges in each light reception element to a corresponding overflow drain by lowering the potential of the second semiconductor region and thereafter to generate and accumulate charges in each light reception element by raising the potential of the second semiconductor region, when any one of the monitor mode and the photographing mode is selected.

23. A solid state image pickup device according to claim 22, wherein said control means operates to set the potential of the second semiconductor region when the photographing mode is selected and the charges are drained to the overflow drain, lower than the potential of the second semiconductor region when the monitor mode is selected and the charges are drained to the overflow drain.

24. A solid state image pickup device according to claim 22, wherein said control means operates to set the potential of the second semiconductor region when the photographing mode is selected and the charges are drained to the overflow drain, equal to the potential of the second semiconductor region when the monitor mode is selected and the charges are drained to the overflow drain.

25. A solid state image pickup device according to claim 21, further comprising light transmission/interception means for transmitting or intercepting incidence light to each light reception element, wherein said control means operates to generate and accumulate charges in each light reception element in a state that incidence light to the light reception elements is transmitted, thereafter to transfer the charges in the light reception elements to the vertical charge transfer paths in a state that the incidence light to the light reception elements is intercepted, and to transfer the charges in the vertical charge transfer paths.

26. A solid state image pickup device according to claim 25, wherein said control means operates to transfer unnecessary charges in the vertical charge transfer paths in a state that charges are accumulated in each light reception element, after the charges are generated and accumulated in each light reception element and before the charges in each light reception element is transferred to the vertical charge transfer paths.

27. A solid state image pickup device according to claim 20, wherein each overflow drain region is formed at a deeper position than a corresponding light reception element in the semiconductor substrate, and said control means sets the potential of the second semiconductor region by controlling a voltage applied to the semiconductor substrate.

28. A solid state image pickup device according to claim 20, wherein each overflow drain region is formed at a position spaced apart in a horizontal direction from a corresponding light reception element in the semiconductor substrate, and the solid state image pickup device further comprises a drain gate formed over the second semiconductor region with an insulating film being interposed therebetween, and said control means sets a potential of the second semiconductor region by controlling a voltage applied to the semiconductor substrate.

29. A solid state image pickup device including a semiconductor substrate formed with at least:
light reception elements disposed in two-dimensional rows and columns for performing charge generation and accumulation through photoelectric conversion, the light reception elements being assigned to first and second fields;
a plurality of vertical charge transfer paths for transferring the charges generated by the light reception elements, each vertical transfer path being provided in correspondence with each light reception column;
overflow drain regions capable of draining charges in the light reception elements;
a first semiconductor region between each light reception element and a corresponding vertical charge transfer path;
a second semiconductor region between each light reception element and a corresponding overflow drain region; and
a transfer gate provided for each light reception element for transferring the charges in each light reception element to a corresponding vertical charge transfer path by controlling a potential of the first semiconductor region, the transfer gate being formed over the first semiconductor region with an insulating film being interposed therebetween, and
the solid state image pickup device comprising:
potential control means for controlling a bias potential of the second semiconductor region, wherein substantially all charges in each light reception element are directly drained to corresponding overflow drain region.

30. A method of controlling a solid state image pickup device according to claim 1, wherein the step of directly draining substantially all charges precedes step (a).

31. A method of controlling a solid state image pickup device according to claim 1, wherein a potential of the second semiconductor region is lower than a potential of each light reception element in the step of directly draining substantially all charges.

32. A solid state image pick up device according to claim 7, wherein the potential setting means sets a potential of the second semiconductor region lower than a potential of each light reception element for directly draining substantially all charges from each light reception element.

33. A solid state image pick up device according to claim 10, wherein the control means sets a potential of the second semiconductor region lower than a potential of each light reception element for directly draining substantially all charges from each light reception element.

34. A method of controlling a solid state image pickup device according to claim 1, wherein the second semiconductor region has a variable potential level.

35. A method of controlling a solid state image pickup device according to claim 1, wherein the overflow drain regions directly drain charges in the light reception elements.

* * * * *